(12) United States Patent
Arai et al.

(10) Patent No.: US 8,744,216 B2
(45) Date of Patent: Jun. 3, 2014

(54) OMNIDIRECTIONAL IMAGE PROCESSING DEVICE AND METHOD USING WARP PROCESSING FOR ENHANCED OBJECT VISIBILITY

(75) Inventors: Yuko Arai, Tokyo (JP); Yuichiro Takemoto, Kanagawa (JP); Masataka Sugiura, Tokyo (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 13/264,499

(22) PCT Filed: Jan. 26, 2011

(86) PCT No.: PCT/JP2011/000422
§ 371 (c)(1),
(2), (4) Date: Oct. 14, 2011

(87) PCT Pub. No.: WO2011/114610
PCT Pub. Date: Sep. 22, 2011

(65) Prior Publication Data
US 2012/0045149 A1    Feb. 23, 2012

(30) Foreign Application Priority Data
Mar. 18, 2010 (JP) ................ 2010-062560

(51) Int. Cl.
*G06K 9/32* (2006.01)
*G06T 3/00* (2006.01)

(52) U.S. Cl.
CPC .................. *G06T 3/0018* (2013.01)
USPC ......................................... 382/296

(58) Field of Classification Search
CPC .................................. G06T 3/0018
See application file for complete search history.

(56) References Cited

U.S. PATENT DOCUMENTS 5,185,667 A * 2/1993 Zimmermann .......... 348/207.99
6,130,783 A    10/2000 Yagi et al.
(Continued)

FOREIGN PATENT DOCUMENTS

CN    1492280    4/2004
CN    1554036    12/2004
(Continued)

OTHER PUBLICATIONS

Yamazawa et al., "Visual Navigation with Omnidirectional Image Sensor HyperOmni Vision", Transactions of IEICE D-II, IEICE, vol. J79-D-II, May 25, 1996, pp. 698-707, (discussed in specification).

(Continued)

*Primary Examiner* — Bhavesh Mehta
*Assistant Examiner* — Andrew Moyer
(74) *Attorney, Agent, or Firm* — Greenblum & Bernstein, P.L.C.

(57) ABSTRACT

An omnidirectional image processing apparatus enables the visibility of a specified monitoring object in an omnidirectional image to be improved while maintaining the continuity of that omnidirectional image. The omnidirectional image processing apparatus performs image processing on an omnidirectional image, and has a monitoring object specification section that specifies a monitoring object photographed in the omnidirectional image. The omnidirectional image processing apparatus also has an image rotating section that rotates the omnidirectional image so that the position of a specified monitoring object becomes upper-central, and a center position moving section that moves the center position of the omnidirectional image rotated by the image rotating section downward by means of warping processing.

9 Claims, 24 Drawing Sheets

(56) References Cited

U.S. PATENT DOCUMENTS

| | | | |
|---|---|---|---|
| 6,762,789 | B1 | 7/2004 | Sogabe et al. |
| 6,795,113 | B1* | 9/2004 | Jackson et al. ............ 348/207.1 |
| 6,865,028 | B2 | 3/2005 | Moustier et al. |
| 2003/0160863 | A1* | 8/2003 | Kakou et al. .................... 348/46 |
| 2004/0169726 | A1 | 9/2004 | Moustier et al. |
| 2005/0062845 | A1* | 3/2005 | Mills .............................. 348/36 |
| 2005/0259146 | A1 | 11/2005 | Berdugo |
| 2009/0207246 | A1* | 8/2009 | Inami et al. .................. 348/135 |
| 2009/0309957 | A1* | 12/2009 | Ge et al. ......................... 348/36 |
| 2010/0246885 | A1* | 9/2010 | Lee et al. ...................... 382/103 |

FOREIGN PATENT DOCUMENTS

| | | |
|---|---|---|
| CN | 1739051 | 2/2006 |
| JP | 11-243508 | 9/1999 |
| JP | HEI11-331654 | 11/1999 |
| JP | 2000-011166 | 1/2000 |
| JP | 2000-132673 | 5/2000 |
| JP | 2001-008232 | 1/2001 |
| JP | 2003-132348 | 5/2003 |
| JP | 2004-246673 | 2/2004 |
| JP | 2006-074105 | 3/2006 |
| JP | 2008-48443 | 2/2008 |

OTHER PUBLICATIONS

International Search Report, mailed Feb. 22, 2011, for corresponding International Application No. PCT/JP2001/000422.

Search Report (English language translation) annexed to China Office Action, mailed Feb. 8, 2014, for corresponding Chinese Patent Application.

* cited by examiner

| FRAME ID | MONITORING OBJECT ID | IN-IMAGE POSITION |
|---|---|---|
| 10 | 5 | (780,550) |
|  | 11 | (800,70) |
|  | 20 | (160,500) |
| 11 | 5 | (780,552) |
|  | 11 | (800,70) |
|  | 20 | (160,500) |
|  | 90 | (2,400) |

OMNIDIRECTIONAL IMAGE PROCESSING DEVICE AND METHOD USING WARP PROCESSING FOR ENHANCED OBJECT VISIBILITY

TECHNICAL FIELD

The present invention relates to an omnidirectional image processing apparatus and omnidirectional image processing method that perform image processing on an omnidirectional image.

BACKGROUND ART

An omnidirectional camera provides for an omnidirectional image to be photographed in a single shot by using a camera configured by combining a special optical system such as a fisheye lens, spherical mirror, or the like with an ordinary camera (see Non-Patent Literature 1, for example). Omnidirectional cameras are used in a wide range of fields, including monitoring systems. However, in an omnidirectional image there is major image distortion of people, objects, and suchlike individual photographic subjects (hereinafter referred to as "monitoring objects"), making it difficult to grasp the appearance of individual monitoring objects.

Thus, technologies have hitherto been proposed that perform image processing on an omnidirectional image (see Patent Literature 1 and Patent Literature 2, for example). The technology described in Patent Literature 1 converts an omnidirectional image to an annular image—specifically, to an image displayed within an area between two larger and smaller ellipses with different center positions. By means of this technology, it is possible to easily grasp the positional relationship of individual monitoring objects. The technology described in Patent Literature 2 performs coordinate conversion of an omnidirectional image to a panoramic landscape-format image, and performs distortion correction by clipping an image of a specified monitoring object. By means of this technology, it is possible to generate an image with little individual monitoring object image distortion from an omnidirectional image.

CITATION LIST

Patent Literature

PTL 1
Japanese Patent Application Laid-Open No. 2003-132348
PTL 2
Japanese Patent Application Laid-Open No. 2008-48443
PTL 3
Japanese Patent Application Laid-Open No. HEI11-331654

Non-Patent Literature

NPL 1
YAMAZAWA Kazumasa, YAGI Yasushi, YACHIDA Masahiko, "Visual Navigation with Omnidirectional Image Sensor HyperOmni Vision," Transactions of IEICE D-II, IEICE, 25 May 1996, Vol. J79-D-II, p. 698-707

SUMMARY OF INVENTION

Technical Problem

However, with the technologies described in Patent Literature 1 and Patent Literature 2, it may be difficult to grasp the detailed situation of monitoring objects in a wide range, or to intuitively grasp the ambient situation of a monitoring object.

With the technology described in Patent Literature 1, the reason for this is that, if a monitoring object is present in the narrower of areas between two larger and smaller ellipses with different center positions, an image of a monitoring object and monitoring object surroundings is reduced. And with the technology described in Patent Literature 2, the reason is that only a specified monitoring object image part is clipped and displayed, and omnidirectional image continuity is lost.

It is therefore an object of the present invention to provide an omnidirectional image processing apparatus and method thereof that improve the visibility of a specified monitoring object in an omnidirectional image while maintaining the continuity of that omnidirectional image.

Solution to Problem

An omnidirectional image processing apparatus of the present invention performs image processing on an omnidirectional image, and has: a monitoring object specification section that specifies a monitoring object photographed in the omnidirectional image; an image rotating section that rotates the omnidirectional image so that the position of the specified monitoring object becomes upper-central; and a center position moving section that moves the center position of the omnidirectional image rotated by the image rotating section downward by means of warping processing.

An omnidirectional image processing method of the present invention performs image processing on an omnidirectional image, and has: a step of specifying a monitoring object photographed in the omnidirectional image; a step of rotating the omnidirectional image so that the position of the specified monitoring object becomes upper-central; and a step of moving the center position of the rotated omnidirectional image downward by means of warping processing.

Advantageous Effects of Invention

The present invention enables the visibility of a specified monitoring object in an omnidirectional image to be improved while maintaining the continuity of that omnidirectional image.

DESCRIPTION OF EMBODIMENT

Now, an embodiment of the present invention will be described in detail with reference to the accompanying drawings.

Figure 1:
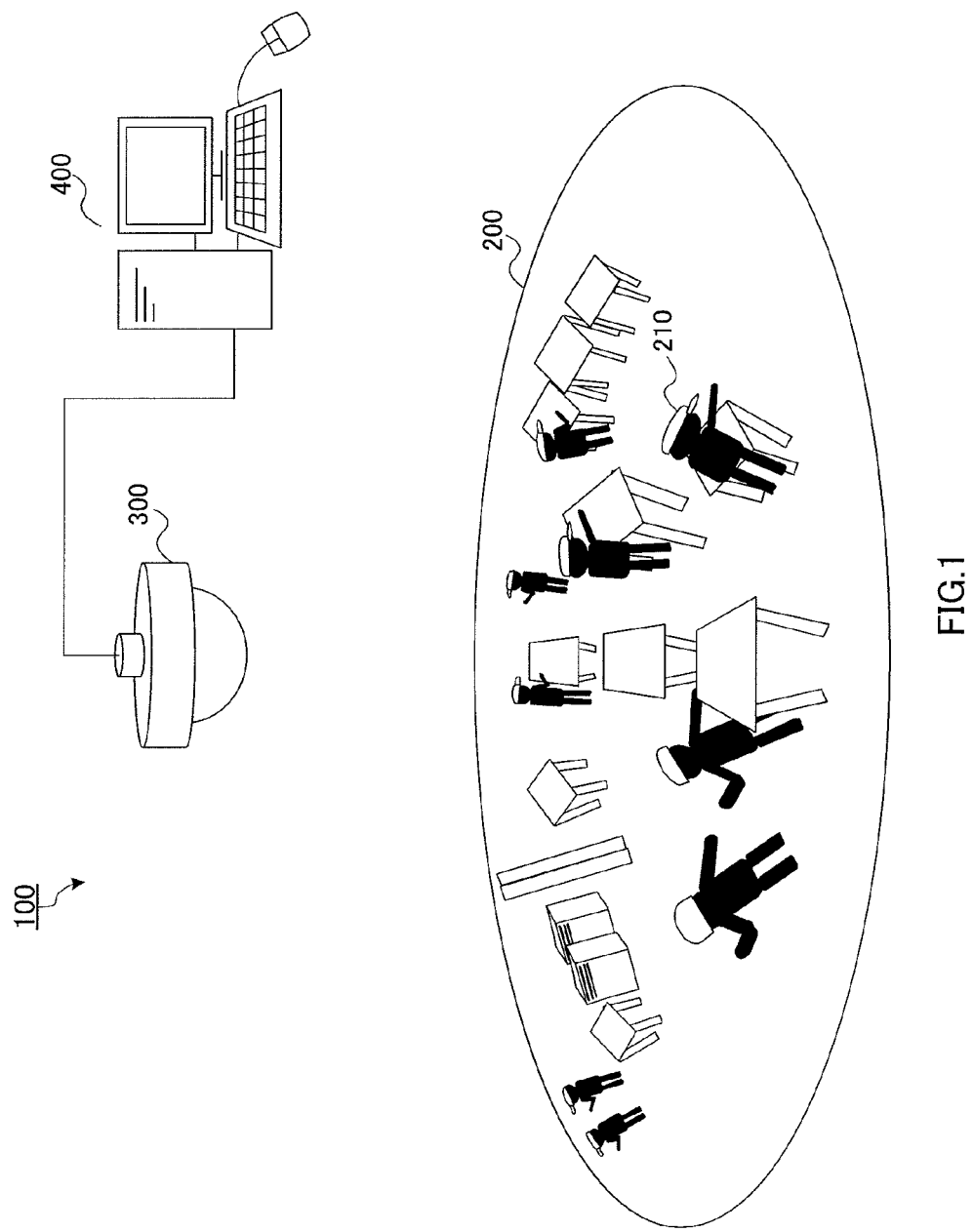
FIG. 1 is a system configuration diagram showing an installation example of a monitoring system that includes an omnidirectional image processing apparatus according to an embodiment of the present invention.

FIG. 1 is a system configuration diagram showing an installation example of a monitoring system that includes an omnidirectional image processing apparatus according to an embodiment of the present invention. This embodiment is an example in which the present invention is applied to a monitoring system for monitoring workers in a factory.

As shown in FIG. 1, monitoring system 100 has omnidirectional camera 300 installed on the ceiling or the like of monitored area 200 in a factory, facing the floor, and omnidirectional image processing apparatus 400 connected to omnidirectional camera 300 so as to be able to communicate therewith.

Omnidirectional camera 300 is a camera capable of photographing an omnidirectional image, and here, a camera that uses a special mirror such as described in the Non-Patent Literature will be described as an example. Omnidirectional camera 300 photographs monitored area 200 in which workers 210 are working while the factory is operating, and transmits moving image data that is time series data of a photographed omnidirectional image to omnidirectional image processing apparatus 400.

Figure 2:
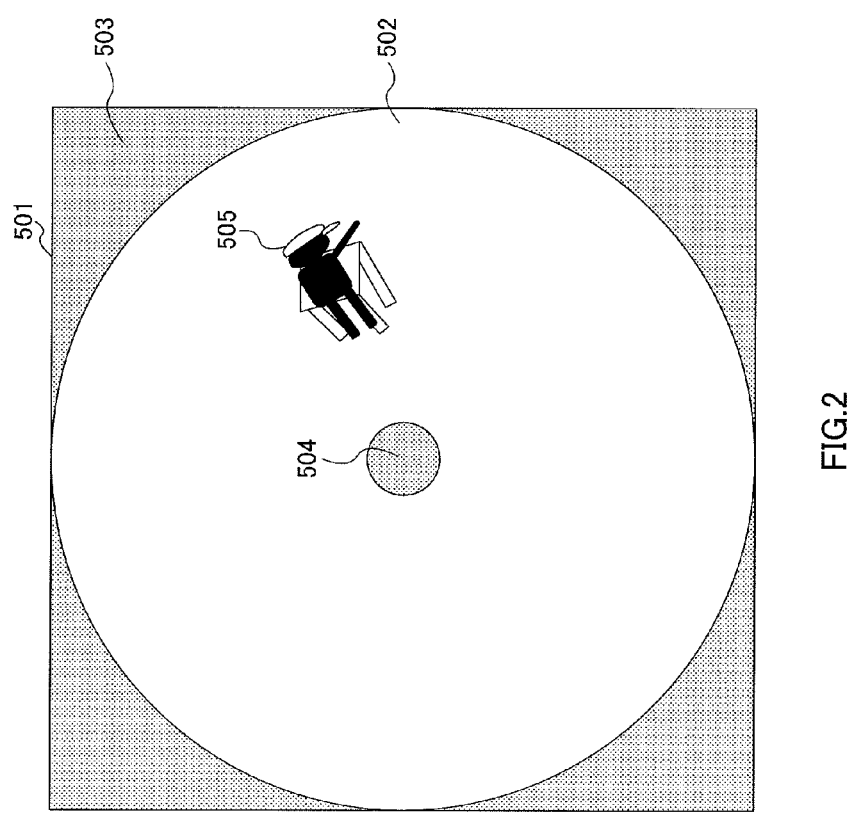
FIG. 2 is a drawing showing an example of an omnidirectional image in this embodiment.

FIG. 2 is a drawing showing an example of an omnidirectional image photographed by omnidirectional camera 300.

As shown in FIG. 2, the shape of image 501 of moving image data transmitted to omnidirectional image processing apparatus 400 by omnidirectional camera 300 is square, whereas the shape of omnidirectional image 502 in which monitored area 200 is photographed is circular. This is because the maximum cross-section with respect to the optical axis of a mirror used in this embodiment is circular. Therefore, non-photographed parts 503 occur in the four corners of moving image data image 501. Also, since omnidirectional camera 300 according to this embodiment has a small reflecting mirror installed on the incident light axis, circular blind area 504 may occur in the center of omnidirectional image 502. The reason for the occurrence of a blind area is explained in Non-Patent Literature 1 and Patent Literature 3, and therefore an explanation thereof will be omitted here.

Here, an omnidirectional image photographed by omnidirectional camera 300 is a downward-view image—that is, an image whose center is directly below the omnidirectional camera. Therefore, in image 505 of a worker standing on the floor of monitored area 200, the head is oriented toward the circumference of omnidirectional image 502, and the lower body is oriented toward the center of omnidirectional image 502. Square-shaped moving image data image 501 corresponds to one frame, but below, circle-shaped omnidirectional image 502 including blind area 504 is described as an image processing object.

Omnidirectional image processing apparatus 400 in FIG. 1 is, for example, a personal computer. Omnidirectional image processing apparatus 400 performs image processing on an omnidirectional image received from omnidirectional camera 300, and converts this image to an image that is used in flow line analysis or the like with the aim of improving the work efficiency of workers in a factory. Specifically, omnidirectional image processing apparatus 400 performs processing that rotates an omnidirectional image, and warping processing or the like that moves the center position of an omnidirectional image. Then omnidirectional image processing apparatus 400 displays an omnidirectional image on which such processing has been performed.

Image rotation processing is processing that rotates an omnidirectional image so that a specified monitoring object is positioned in the upper center of the omnidirectional image.

Warping processing is assumed to refer to deforming an image by executing nonlinear geometric transformations on division areas into which an image is divided so that an adjacency relationship between the division areas is not destroyed. Warping processing here is, for example, processing that moves the center position of an omnidirectional image.

Omnidirectional image processing apparatus 400 of the present invention can display an omnidirectional image that enables the overall appearance of monitored area 200 to be grasped. That is to say, omnidirectional image processing apparatus 400 can convert an omnidirectional image to an image in which there is little distortion of a specified monitoring object image area while maintaining the continuity of that image, and display the converted image. It is also possible for omnidirectional image processing apparatus 400 to perform enlarged display of an image area that includes a monitoring object. By this means, a user, such as a system administrator or the like, can recognize the detailed situation of a specified monitoring object (here, worker 210), and the ambient situation, by viewing a converted image.

The configuration of omnidirectional image processing apparatus 400 will now be described.

Figure 3:
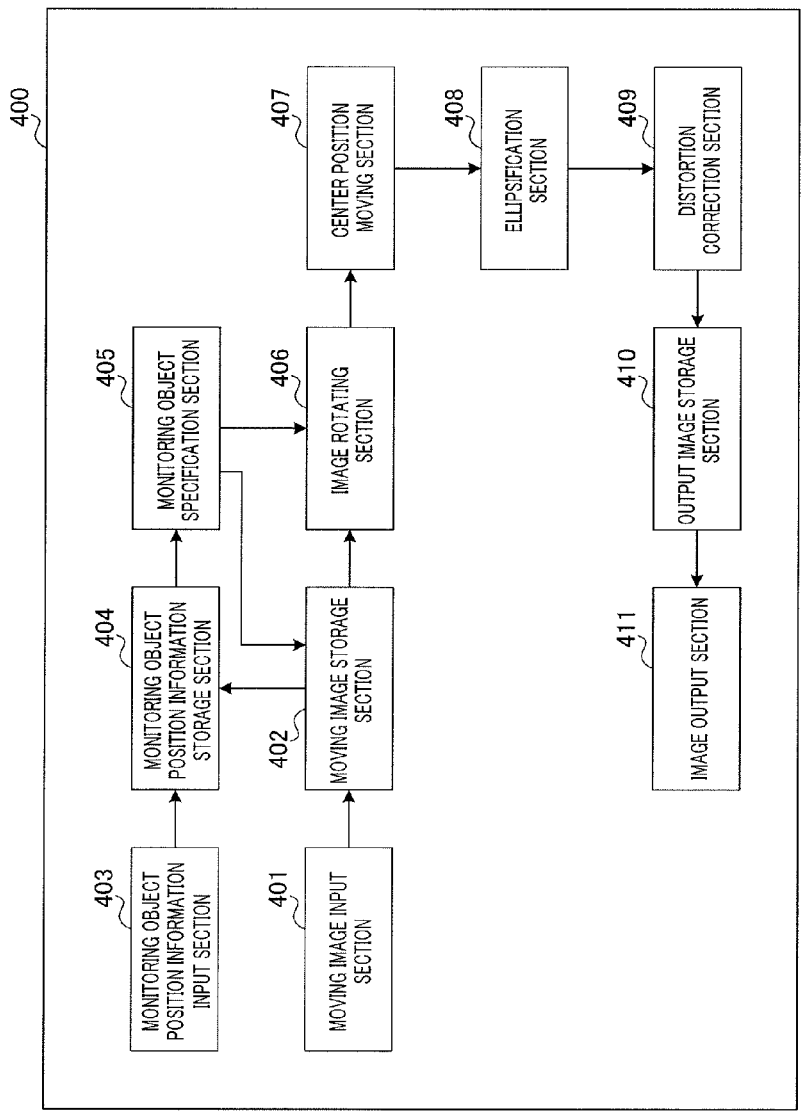
FIG. 3 is a block diagram showing the configuration of an omnidirectional image processing apparatus according to this embodiment.

FIG. 3 is a block diagram showing the configuration of omnidirectional image processing apparatus 400.

In FIG. 3, omnidirectional image processing apparatus 400 has moving image input section 401, moving image storage section 402, monitoring object position information input section 403, monitoring object position information storage section 404, monitoring object specification section 405, image rotating section 406, center position moving section 407, ellipsification section 408, distortion correction section 409, output image storage section 410, and image output section 411.

Moving image input section 401 inputs moving image data. Here, moving image input section 401 receives moving image data of an omnidirectional image in which monitored area 200 has been photographed from omnidirectional camera 300, and encodes the received moving image data. When performing encoding, moving image input section 401 assigns a frame ID (a value that is incremented by 1 each time) to each moving image data, and also assigns the encoding time as a time stamp. Moving image input section 401 outputs encoded moving image data to moving image storage section 402.

Moving image storage section 402 stores moving image data input from moving image input section 401 in a moving image format comprising a plurality of frames, such as the H.264 format. Then moving image storage section 402 receives a directive from monitoring object specification section 405, and outputs a frame (omnidirectional image) with a frame ID specified by monitoring object specification section 405 to image rotating section 406. Moving image storage section 402 also holds a frame time correspondence table in a state enabling referencing by monitoring object position information storage section 404. The frame time correspondence table comprises information indicating a correspondence relationship between a frame ID and a time at which the corresponding frame was photographed (a time input from moving image input section 401).

Monitoring object position information input section 403 inputs monitoring object position information of each monitoring object at predetermined intervals (for example, every 0.5 second), and outputs input monitoring object position information to monitoring object position information storage section 404. Monitoring object position information is information indicating a time, and two-dimensional position coordinates on an omnidirectional image of a representative point of a monitoring object present in monitored area 200 at that time (hereinafter referred to as an "in-screen position"), in a mutually associated fashion. A representative point of a monitoring object is, for example, a position of a wireless tag when acquired using a wireless tag, or the center point of a monitoring object image area when acquired by means of image recognition performed on an omnidirectional image.

Monitoring object position information storage section 404 generates monitoring object position management information based on a frame time correspondence table input from moving image storage section 402 and monitoring object position information input from monitoring object position information input section 403, and stores that monitoring object position management information. Monitoring object position information storage section 404 stores this information in a state enabling referencing by monitoring object specification section 405.

Monitoring object specification section 405 specifies an omnidirectional image (frame) to be displayed from among the moving image data stored by moving image storage section 402. Monitoring object specification section 405 also specifies a monitoring object to be displayed in a particularly easy-to-see fashion from among monitoring objects photographed in an omnidirectional image. Details of the actual frame and monitoring object specification methods will be given later herein. Monitoring object specification section 405 causes moving image storage section 402 to output an omnidirectional image of a specified frame to image rotating section 406.

Monitoring object specification section 405 detects an in-screen position of a specified monitoring object in a specified frame. Then monitoring object specification section 405 acquires a detected specified monitoring object in-screen position (hereinafter referred to as "specified monitoring object position"), and outputs this in-screen position to image rotating section 406. Monitoring object specification section 405 is here assumed to receive specified frame and specified monitoring object selections from a user, using a display apparatus such as a liquid crystal display and an input apparatus such as a keyboard and/or mouse (neither of which is shown).

Based on a specified monitoring object position, image rotating section 406 performs the above image rotation processing on an omnidirectional image of a specified frame input from moving image storage section 402. Image rotating section 406 also extracts an image area occupied by a specified monitoring object within an omnidirectional screen (hereinafter referred to as "specified monitoring object area"). Then image rotating section 406 outputs an omnidirectional image after image rotation processing has been performed, and a specified monitoring object position and specified monitoring object area (information combining the two is referred to below as "monitoring object position information"), to center position moving section 407.

Below, an omnidirectional image immediately before image rotation processing is performed is referred to as a "pre-rotation image," and an omnidirectional image immediately after image rotation processing has been performed is referred to as a "post-rotation image."

Center position moving section 407 performs warping processing that moves the center position of a post-rotation image downward (hereinafter referred to as "center position movement processing") on a post-rotation image input from image rotating section 406. Then center position moving section 407 outputs a post-rotation image after center position movement processing has been performed, and monitoring object position information, to ellipsification section 408.

Below, an omnidirectional image immediately before center position movement processing is performed is referred to as a "pre-movement image," and an omnidirectional image immediately after center position movement processing has been performed is referred to as a "post-movement image."

Ellipsification section 408 performs processing (hereinafter referred to as "ellipsification processing") on a post-movement image input from center position moving section 407 whereby the shape of that image is changed from a circle to an ellipse by means of a linear projective transformation. Then ellipsification section 408 outputs a post-movement image after ellipsification processing has been performed, and monitoring object position information, to distortion correction section 409.

Below, an omnidirectional image immediately before ellipsification processing is performed is referred to as a "pre-ellipsification image," and an omnidirectional image immediately after ellipsification processing has been performed is referred to as a "post-ellipsification image."

Distortion correction section 409 performs processing that corrects omnidirectional image specific distortion (hereinafter referred to as "distortion correction processing") for a specified monitoring object area of a post-ellipsification image input from ellipsification section 408. Then distortion correction section 409 outputs a post-ellipsification image after distortion correction processing has been performed, and monitoring object position information, to output image storage section 410.

Below, an omnidirectional image immediately before distortion correction processing is performed is referred to as a "pre-distortion-correction image," and an omnidirectional image immediately after distortion correction processing has been performed is referred to as a "post-distortion-correction image."

Output image storage section 410 stores a post-distortion-correction image input from distortion correction section 409.

Image output section 411 reads a post-distortion-correction image stored by output image storage section 410 as a final omnidirectional image, and outputs this image to a display apparatus such as a liquid crystal display.

Omnidirectional image processing apparatus 400 of this kind can be implemented by means of a CPU (central processing unit), a storage medium such as ROM (read only memory) that stores a control program, working memory such as RAM (random access memory), a storage medium such as a hard disk for storing various kinds of data, and so forth. In this case, the functions of the above sections are implemented by execution of the control program by the CPU.

Omnidirectional image processing apparatus 400 having this kind of configuration can display an image of a specified monitoring object in a state closer to a view when the specified monitoring object is viewed in real space in an omnidirectional image, while maintaining the continuity of that omnidirectional image. Also, omnidirectional image processing apparatus 400 can perform enlarged display of an image area that includes a monitoring object. That is to say, omnidirectional image processing apparatus 400 can improve the visibility of a monitoring object that a user wishes to focus on in an omnidirectional image, while maintaining the continuity of that omnidirectional image.

The overall operation of omnidirectional image processing apparatus 400 will now be described.

Here, it is assumed that, after performing an information storage operation, omnidirectional image processing apparatus 400 performs an image processing operation that processes an omnidirectional image based on stored moving image data and monitoring object position management information. Here, an information storage operation is assumed to be an operation that stores moving image data and monitoring object position management information. First, an information storage operation will be described.

Omnidirectional image processing apparatus 400 first inputs moving image data photographed by omnidirectional camera 300 via moving image input section 401, and stores this data in moving image storage section 402. Moving image storage section 402 generates a frame time correspondence table for stored moving image data.

Figure 4:
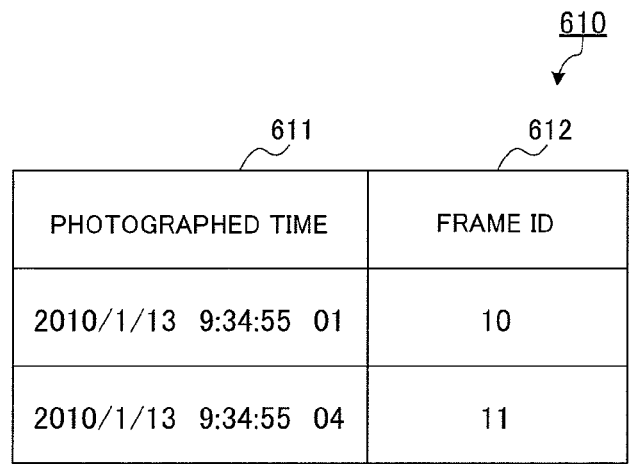
FIG. 4 is a drawing showing an example of a frame time correspondence table in this embodiment.

FIG. 4 is a drawing showing an example of a frame time correspondence table.

As shown in FIG. 4, frame time correspondence table 610 holds omnidirectional image photographed time 611 and frame ID 612 of that omnidirectional image in a mutually associated fashion. The photographing cycle is fixed, and one frame corresponds to one photographed time.

Here, it is assumed that the time from photographing of an omnidirectional image until input of a corresponding frame to moving image storage section 402 is extremely short. Therefore, moving image storage section 402 uses an input time itself as frame ID 612. When the time required until a corresponding frame is input to moving image storage section 402 after an omnidirectional image is photographed is considered, moving image storage section 402 can use a time upstream by that time period from the input time as photographed time 611.

Monitoring object position information input section 403 inputs monitoring object position information of a photographed monitoring object for a monitoring object present in monitored area 200—that is, an omnidirectional image photographed by omnidirectional camera 300. Monitoring object position information includes a time and a position in an omnidirectional image of each monitoring object. Monitoring object position information input section 403 outputs input monitoring object position information to monitoring object position information storage section 404.

Figure 5:
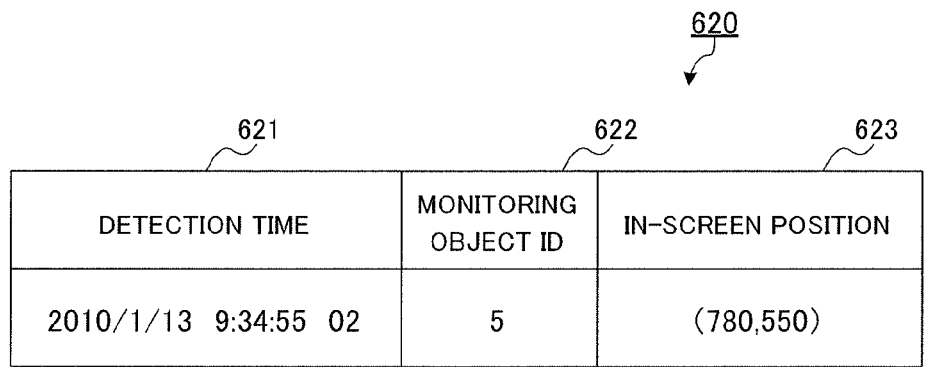
FIG. 5 is a drawing showing an example of monitoring object position information in this embodiment.

FIG. 5 is a drawing showing an example of monitoring object position information.

As shown in FIG. 5, monitoring object position information 620 contains detection time 621 at which monitoring object position detection was performed, monitoring object ID 622, and detected monitoring object in-screen position 623, in a mutually associated fashion. In-screen position 623 indicates a position in moving image data, and is represented, for example, by coordinate values when an xy coordinate system is defined with the bottom-left corner of moving image data as the origin, as described later herein.

Monitoring object position information can be obtained by means of positioning using a wireless tag, image recognition performed on an omnidirectional image, and so forth.

In the case of positioning using a wireless tag, monitoring object position information input section 403, for example, stores beforehand a correspondence relationship between a three-dimensional position in real space (monitored area 200) and a two-dimensional position in an omnidirectional image photographed by omnidirectional camera 300. Then monitoring object position information input section 403 acquires ID information of each monitoring object (hereinafter referred to as "monitoring object ID") and a three-dimensional position in real space of a representative point of each monitoring object from wireless tags attached to each monitoring object at predetermined intervals (for example, every 0.5 second). Next, monitoring object position information input section 403 converts an acquired three-dimensional position to a two-dimensional position in an omnidirectional image. At this time, monitoring object position information input section 403 may use an ID of each wireless tag directly as a monitoring object ID.

When image recognition is used, monitoring object position information input section 403, for example, stores beforehand image features such a facial feature amount and hat color of each monitoring object. Monitoring object position information input section 403 extracts an image area occupied by each monitoring object in an omnidirectional image for each frame corresponding to a predetermined interval. Then monitoring object position information input section 403 performs face recognition, hat color recognition, or the like, and acquires a monitoring object ID of each monitoring object, and also acquires a representative position in the omnidirectional image of each image area as a two-dimensional position of that monitoring object.

Based on monitoring object position information input from monitoring object position information input section 403, monitoring object position information storage section 404 generates monitoring object position management information, and stores the generated monitoring object position management information.

Figure 6:
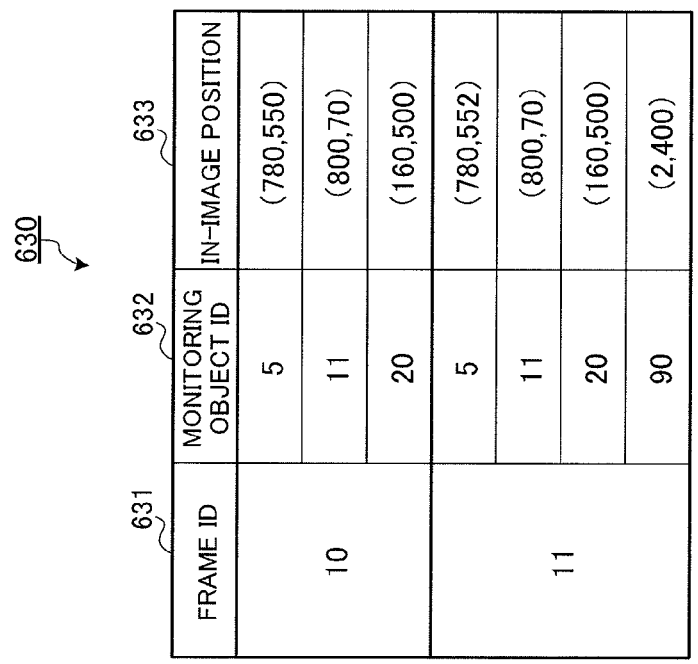
FIG. 6 is a drawing showing an example of monitoring object position management information in this embodiment.

FIG. 6 is a drawing showing an example of monitoring object position management information.

As shown in FIG. 6, monitoring object position management information 630 contains, associated with frame ID 631, monitoring object ID 632 of a monitoring object for which there is a possibility of having been photographed in an omnidirectional image of this frame, and in-screen position 633 thereof.

Monitoring object position information storage section 404 generates monitoring object position management information 630 as described below, for example. Monitoring object position information storage section 404 references frame time correspondence table 610 stored in moving image storage section 402 (see FIG. 4). Then monitoring object position information storage section 404 searches for an interval that includes detection time 621 of monitoring object position information 620 (see FIG. 5) among photographed time 611 intervals contained in frame time correspondence table 610. A photographed time 611 interval means a period from the photographed time of that frame until the photographed time of the next frame. Then monitoring object position information storage section 404 mutually associates frame ID 612 corresponding to a relevant interval shown in monitoring object position management information 630, and monitoring object ID 622 and in-screen position 623 of monitoring object position information 620 shown in FIG. 5.

For example, as shown in FIG. 5, monitoring object position information 620 with monitoring object ID 622 "5" and in-screen position 623 "(780, 550)" associated with detection time 621 "2010/1/13 9:34:55 02" is input. Also, it is assumed that frame time correspondence table 610 with frame ID 612 "10" associated with an interval that includes "2010/1/13 9:34:55 02" has been stored, as shown in FIG. 4.

In this case, generated monitoring object position management information 630 has contents associating monitoring object ID 632 "5" and in-screen position 633 "(780, 550)" with frame ID 631 "10," as shown in FIG. 6.

By means of the above information storage operation, a state is established in which moving image data and monitoring object position management information are stored in moving image storage section 402 and monitoring object position information storage section 404 respectively. In this state, it is possible for omnidirectional image processing apparatus 400 to perform an image processing operation. For example, after completing monitoring object position management information storage of one day's worth of monitored area 200 moving image data, omnidirectional image processing apparatus 400 performs an image processing operation using this data the following day.

An image processing operation will now be described.

Figure 7:
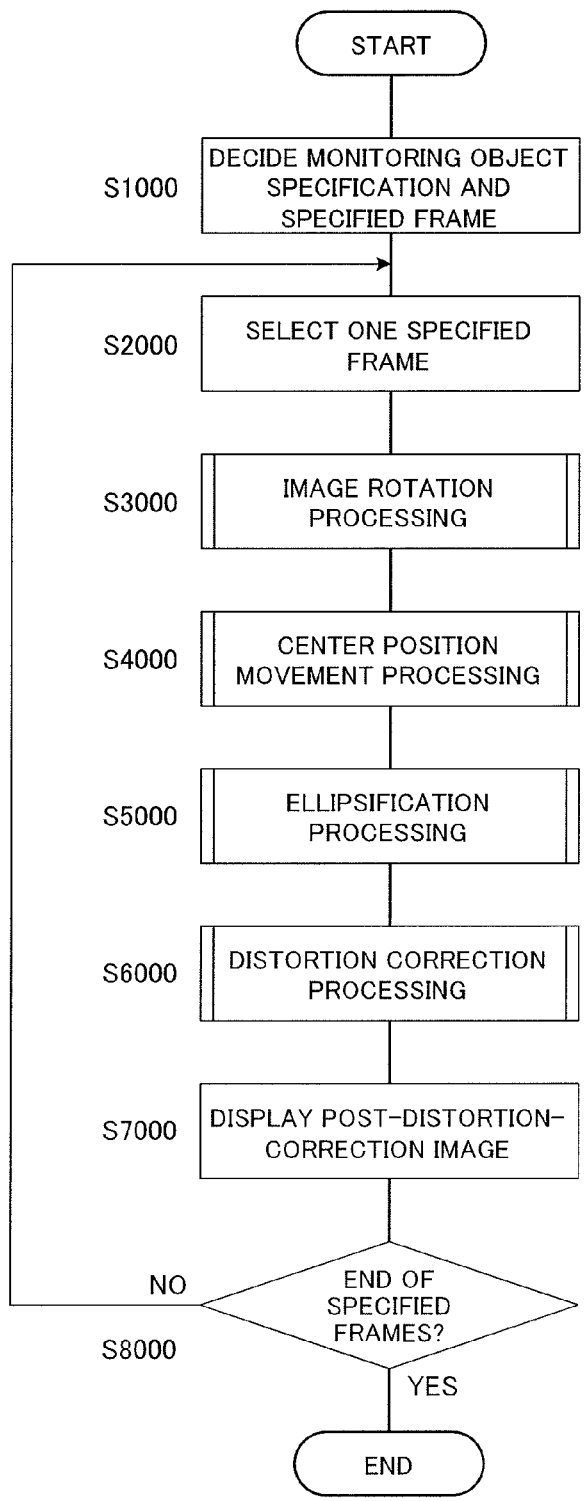
FIG. 7 is a flowchart showing an image processing operation in this embodiment.

FIG. 7 is a flowchart showing an image processing operation of omnidirectional image processing apparatus 400.

First, in step S1000, monitoring object specification section 405 decides a specified monitoring object and specified frame based on monitoring object position management information stored in monitoring object position information storage section 404 (see FIG. 6). A specified monitoring object and specified frame may be decided arbitrarily by a user, or may be decided automatically based on a predetermined rule. The contents of a predetermined rule may be, for example, that a specific worker is taken as a specified monitoring object, and a frame of a time period in which that worker is at work is taken as a specified frame. Also, the contents of a predetermined rule may be, for example, that a frame of a time period in which a monitoring object performing abnormal movement appears is taken as a specified frame. Whether or not movement of a monitoring object is abnormal can be determined, for example, by analyzing the behavior of a monitoring object photographed in moving image data.

Here, monitoring object specification section 405 generates a monitoring object specification screen based on monitoring object position management information stored in monitoring object position information storage section 404, and displays this screen on a liquid crystal display. A monitoring object specification screen here is a screen for selection of a specified monitoring object and specified frame by a user.

Figure 8:
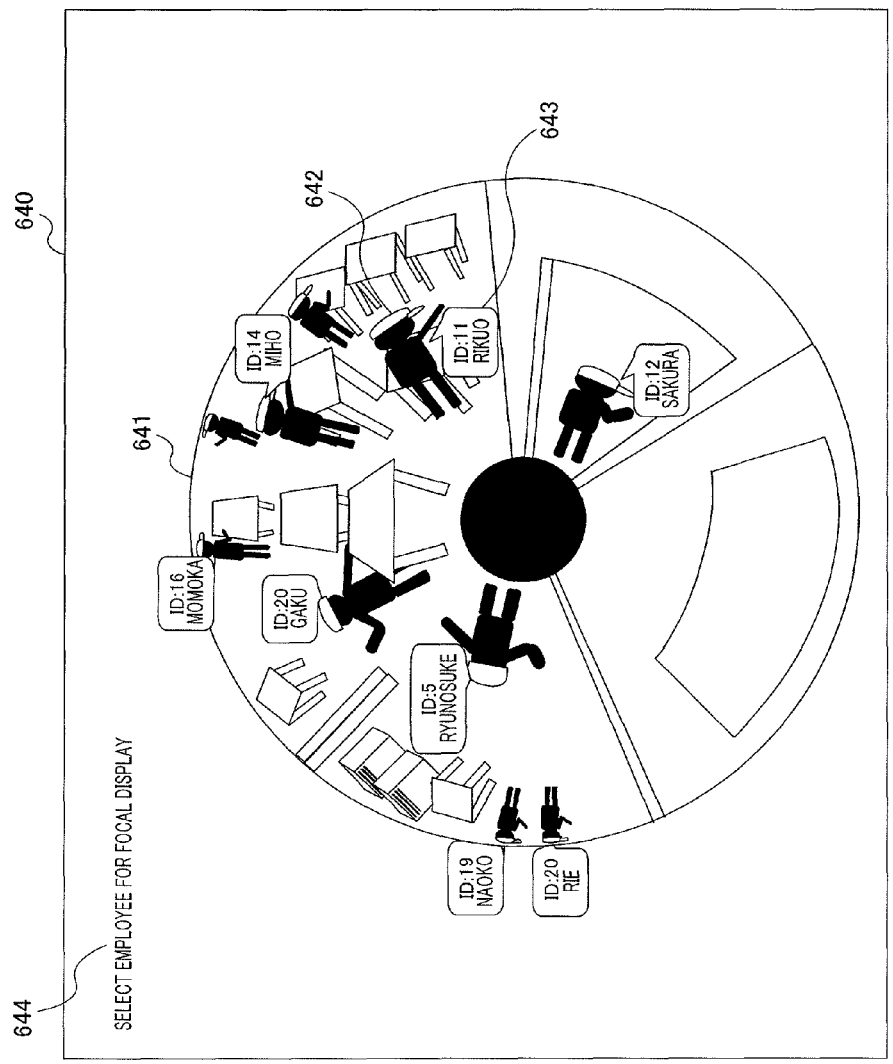
FIG. 8 is a drawing showing a first example of a monitoring object specification screen in this embodiment.

FIG. 8 is a drawing showing a first example of a monitoring object specification screen.

As shown in FIG. 8, monitoring object specification section 405 displays monitoring object ID 643 of each monitoring object 642 in monitoring object specification screen 640, superimposed on representative omnidirectional image 641 stored in moving image storage section 402. Monitoring object ID 643 of each monitoring object 642 is displayed in monitoring object specification screen 640 associated with the in-screen position of that monitoring object 642. Monitoring object specification section 405 also displays message 644 prompting the user to select a monitoring object 642 in monitoring object specification screen 640.

Monitoring object specification section 405 may also display other identification information such as the name of a monitoring object (worker name) associated with a monitoring object ID in monitoring object specification screen 640 together with, or instead of, monitoring object ID 643.

When a monitoring object 642 the user wishes to be displayed in monitoring object specification screen 640 is selected, monitoring object specification section 405 acquires monitoring object ID 643 of that monitoring object 642 as a monitoring object ID of a specified monitoring object. Then monitoring object specification section 405 identifies a frame of an interval in which the specified monitoring object has been photographed based on monitoring object position management information, and acquires the identified frame as a specified frame.

By means of monitoring object specification screen 640 of this kind, a user confirms an image, monitoring object ID 643, and so forth, of each monitoring object 642 in omnidirectional image 641, and selects a specified monitoring object arbitrarily. That is to say, a user can select each frame of an interval in which a selected specified monitoring object is photographed as a specified frame.

Figure 9:
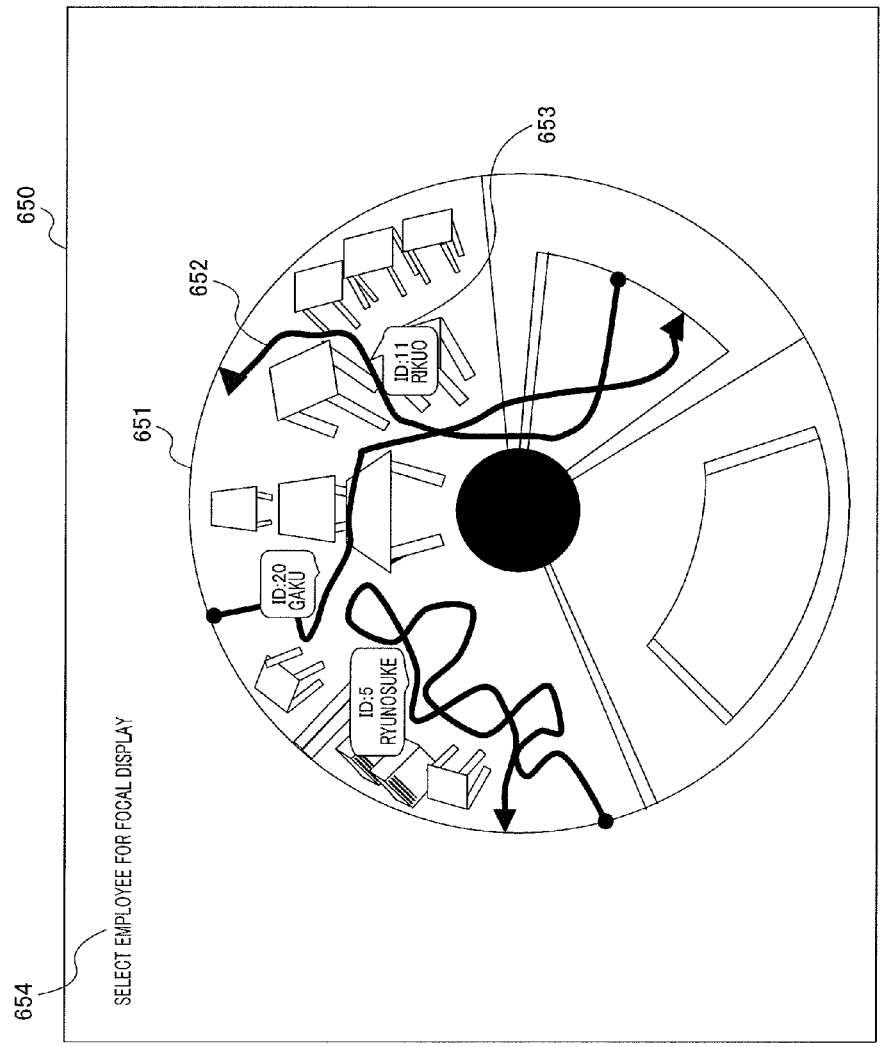
FIG. 9 is a drawing showing a second example of a monitoring object specification screen in this embodiment.

FIG. 9 is a drawing showing a second example of a monitoring object specification screen.

As shown in FIG. 9, monitoring object specification section 405 displays information of each monitoring object in monitoring object specification screen 650, superimposed on omnidirectional image 651 of monitored area 200. Monitoring object information includes flow line 652 of each monitoring object created based on monitoring object position management information, and monitoring object ID 653 associated with each flow line 652. Flow line 652, for example, indicates a position at which a monitoring object enters monitored area 200 by means of a round end, and indicates a position at which a monitoring object leaves monitored area 200 by means of an arrow-shaped end. Monitoring object specification section 405 also displays message 654 prompting the user to select a flow line 652 in monitoring object specification screen 650.

When a flow line 652 the user wishes to be displayed in monitoring object specification screen 650 is selected, monitoring object specification section 405 acquires monitoring object ID 643 of that flow line 652 as a monitoring object ID of a specified monitoring object. Then monitoring object specification section 405 identifies a frame of an interval in which the specified monitoring object has been photographed based on monitoring object position management information, and acquires the identified frame as a specified frame. An interval in which a specified monitoring object has been photographed is an interval from entering to leaving of monitored area 200 by the specified monitoring object.

By means of monitoring object specification screen 650 of this kind, a user can confirm places passed through by respective monitoring objects, and select a specified monitoring object arbitrarily. Then the user can select each frame of an interval in which a selected specified monitoring object is photographed as a specified frame. By this means, for example, in the event of an accident within monitored area 200 it is easy to confirm a worker who passed through the site of the accident, and the movements of that worker, after the accident has occurred.

Figure 10:
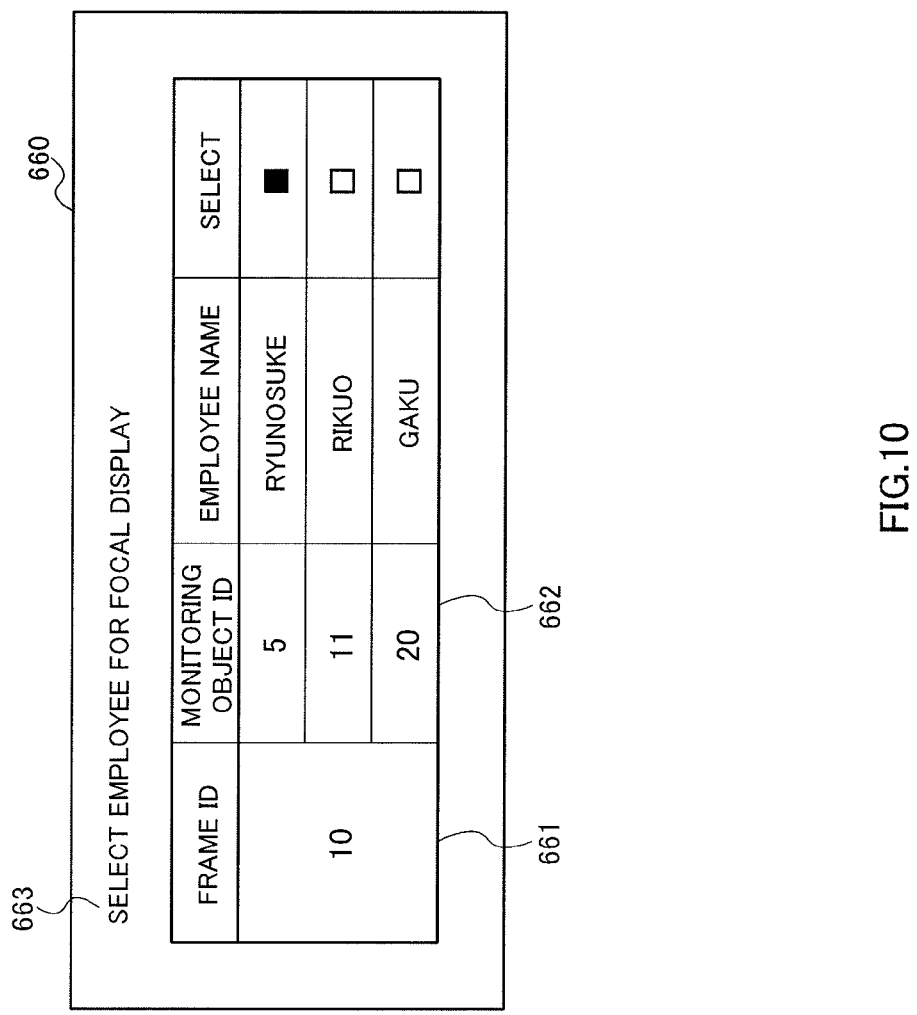
FIG. 10 is a drawing showing a third example of a monitoring object specification screen in this embodiment.

FIG. 10 is a drawing showing a third example of a monitoring object specification screen.

As shown in FIG. 10, monitoring object specification section 405 displays paired frame ID 661 and monitoring object ID 662, for example, in monitoring object specification screen 660. Monitoring object specification section 405 also displays message 663 prompting the user to select one of the pairs in monitoring object specification screen 660.

When a pair the user wishes to be displayed in monitoring object specification screen 660 is selected, monitoring object specification section 405 acquires that frame ID 661/monitoring object ID 662 pair as a monitoring object ID of a specified monitoring object and a frame ID of a specified frame.

By means of monitoring object specification screen 660 of this kind, a user can set a specified monitoring object and specified frame directly by means of a monitoring object ID and frame ID. Then monitoring object specification section 405 identifies a frame of an interval in which the specified monitoring object has been photographed subsequent to the specified frame based on monitoring object position management information, and acquires an identified frame as a specified frame. On completion of step S1000, one specified monitoring object and a specified frame (one or more consecutive frames) in which the specified monitoring object has been photographed have been selected.

A user may wish to continue monitoring the same monitoring object even when new moving image data is input. Considering such a case, provision may be made to allow monitoring object specification section 405 to receive only a frame selection in step S1000, and to take the previously selected monitoring object as a specified monitoring object when only a frame selection is received.

Also, conversely, a user may wish to switch the monitoring object for the same specified frame. Considering such a case, provision may be made to allow monitoring object specification section 405 to receive only a monitoring object selection in step S1000, and to take a previously selected frame as a specified frame when only a monitoring object selection is received.

In step S2000, monitoring object specification section 405 selects a frame with the smallest frame ID number among specified frames on which processing has not been performed. Then monitoring object specification section 405 reports the frame ID of a currently selected specified frame (hereinafter referred to as "currently selected frame ID") to moving image storage section 402, and outputs an omnidirectional image of one specified frame to image rotating section 406.

Also, monitoring object specification section 405 acquires the in-screen position of a specified monitoring object (specified monitoring object position) in an omnidirectional image indicated by the currently selected frame ID from monitoring object position management information stored in monitoring object position information storage section 404 (see FIG. 6). Then monitoring object specification section 405 outputs the acquired specified monitoring object position to image rotating section 406.

In the following description, it is assumed that a monitoring object having monitoring object ID 643 "11" has been selected as a specified monitoring object in monitoring object specification screen 640 shown in FIG. 8.

In step S3000, image rotating section 406 performs image rotation processing on an omnidirectional image input from moving image storage section 402, based on a specified monitoring object position input from monitoring object specification section 405. Here, image rotating section 406 generates an image in which monitoring object having monitoring object ID "11" imaged aslant at the upper-right in monitoring object specification screen 640 shown in FIG. 8 is positioned in the center of the upper part of the image.

Figure 11:
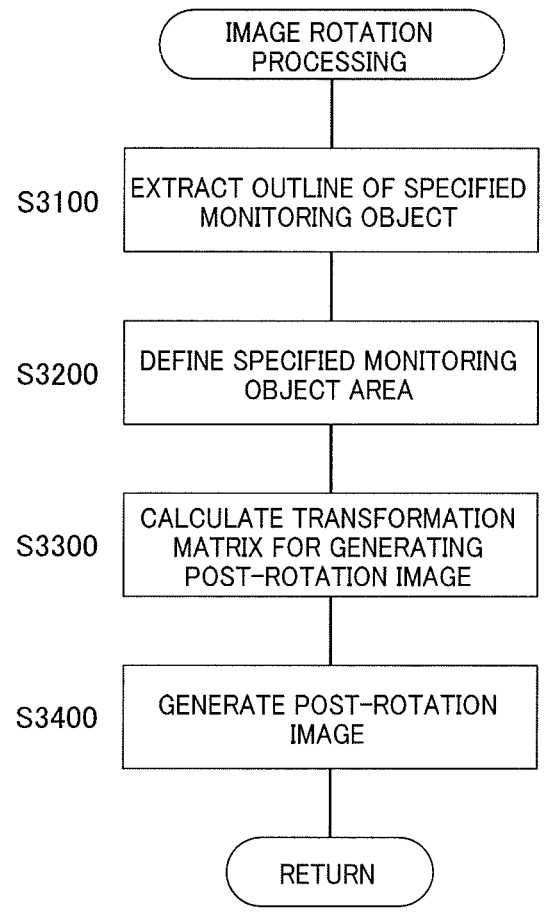
FIG. 11 is a flowchart showing an example of image rotation processing in this embodiment.

FIG. 11 is a flowchart showing an example of image rotation processing.

First, in step S3100, image rotating section 406 extracts an image area occupied by a specified monitoring object within an omnidirectional image (here, a monitoring object having monitoring object ID "11"). For example, image rotating section 406 extracts a monitoring object area by means of a background differencing technique in the vicinity of the specified monitoring object position of a specified monitoring object, and extracts a monitoring object image area by means of template matching using the shape of a monitoring object (for example, a person) as a template.

When monitoring object position information input section 403 acquires monitoring object position coordinates by means of image recognition, image rotating section 406 may define a specified monitoring object area using a monitoring object image area extracted at that time.

Figure 12:
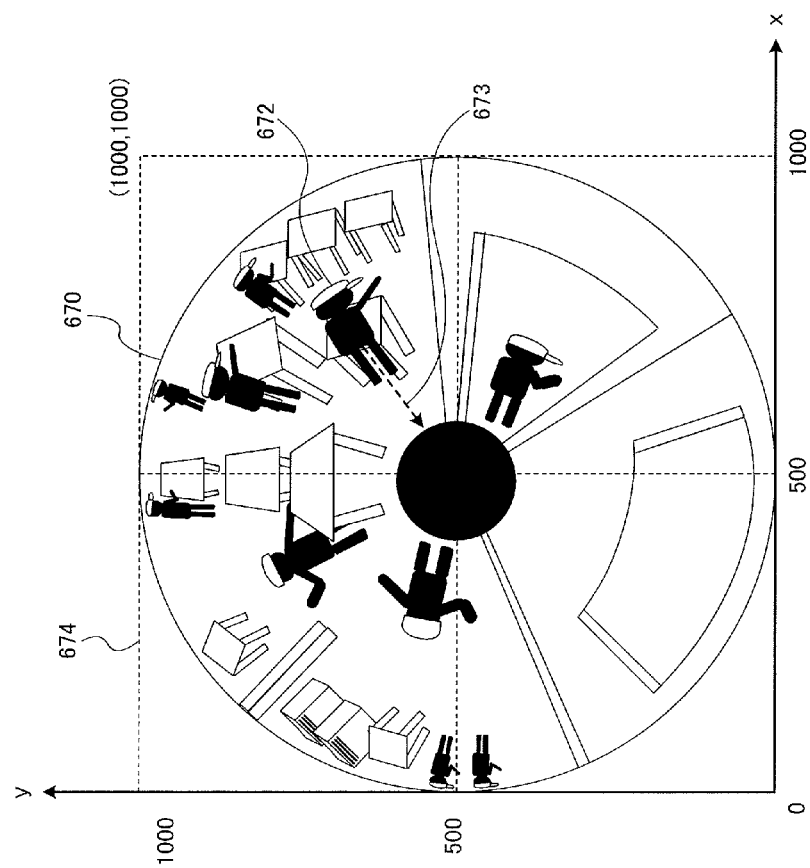
FIG. 12 is a drawing showing an example of an omnidirectional image in initial-state in this embodiment.

FIG. 12 is a drawing showing an example of a specified frame omnidirectional image in initial-state.

As shown in FIG. 12, specified frame omnidirectional image in initial-state (pre-rotation image) 670 is a circular downward-view image in the same way as omnidirectional image 641 of monitoring object specification screen 640 shown in FIG. 8, and is an image whose center is directly below an omnidirectional camera in real space. Therefore, direction 673 corresponding to the vertical direction in real space of image 672 of a specified monitoring object located at the upper-right is inclined at an angle.

In FIG. 12, square moving image data 674 defines the size of omnidirectional image 670 and monitoring object positions and image areas in the omnidirectional image, with the bottom-left corner as the xy coordinate system origin (0, 0), the rightward direction as the x-axis direction, and the upward direction as the y-axis direction.

If the radius of omnidirectional image 670 is designated r, upper endpoint, lower endpoint, right endpoint, and left endpoint coordinates of the omnidirectional image are (r, 2r), (r, 0), (2r, r), and (0, r), respectively. The coordinate values shown in FIG. 12 are examples for a case in which r=500.

Then, in step S3200, image rotating section 406 defines a specified monitoring object area based on an image area extracted in step S3100, and generates monitoring object position information that includes a specified monitoring object position and specified monitoring object area.

Figure 13:
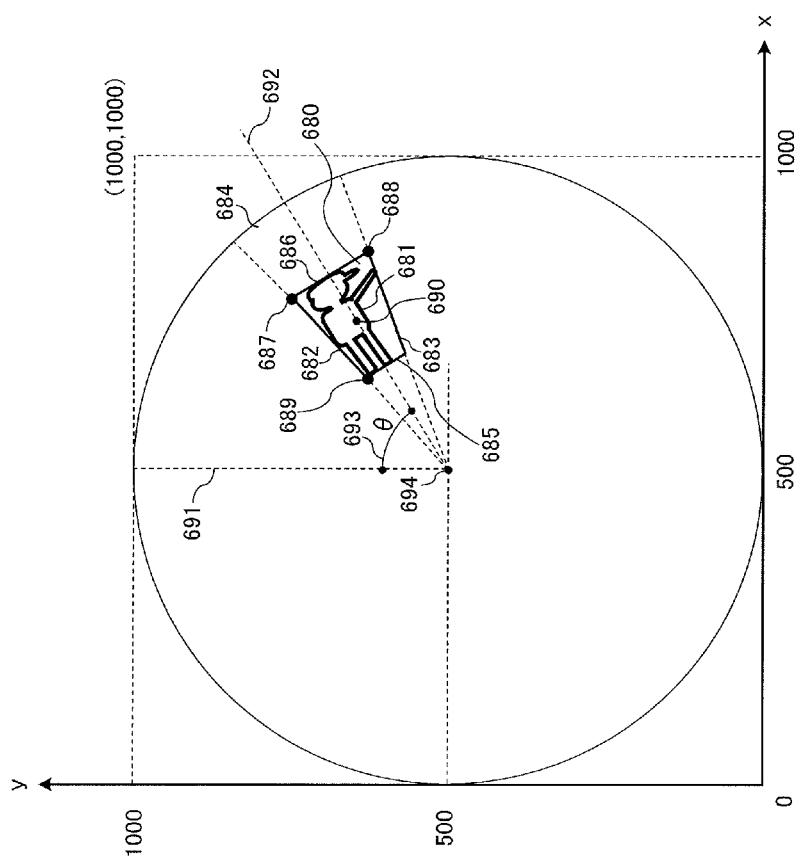
FIG. 13 is a drawing showing an example of definition of a specified monitoring object area in this embodiment.
Figure 14:
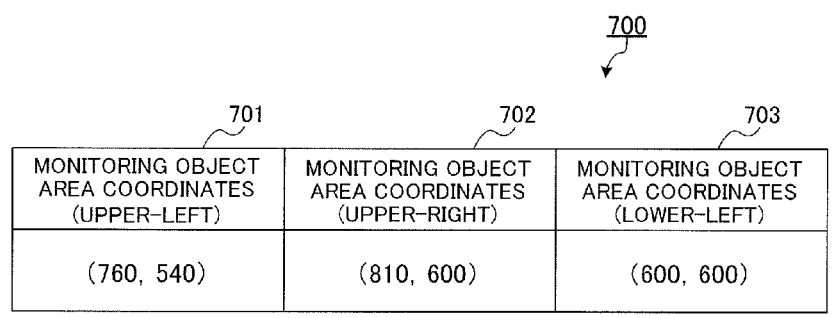
FIG. 14 is a drawing showing an example of monitoring object area information in this embodiment.

FIG. 13 is a drawing showing an example of definition of a specified monitoring object area, and FIG. 14 is a drawing showing an example of monitoring object area information.

As shown in FIG. 13, specified monitoring object area 680 is, for example, an area that circumscribes specified monitoring object image area 681, and is enclosed by an isosceles trapezoid whose non-parallel opposite sides 682 and 683 each coincide with a radial direction of omnidirectional image 684.

As shown in FIG. 14, image rotating section 406 can represent a specified monitoring object area by means of the xy coordinates of three endpoints of an isosceles trapezoid. Monitoring object area coordinates (upper-left) 701 are the coordinates of left endpoint 687 of the longer of parallel opposite sides 685 and 686 of the isosceles trapezoid (the side nearer the circumference). Monitoring object area coordinates (upper-right) 702 are the coordinates of right endpoint 688 of the longer of parallel opposite sides 685 and 686 of the isosceles trapezoid. Monitoring object area coordinates (lower-left) 703 are the coordinates of left endpoint 689 of the shorter of parallel opposite sides 685 and 686 of the isosceles trapezoid (the side nearer the origin).

Then image rotating section 406 calculates a transformation matrix for generating a post-rotation image from a pre-rotation image, based on acquired specified monitoring object position 690.

Specifically, this is done as follows, for example. First, image rotating section 406 acquires specified monitoring object position 690 for a pre-rotation image, and takes angle 693 formed by reference line 691 and monitoring object line 692 as rotation amount θ of omnidirectional image 684. Here, reference line 691 is a line extending in an upward direction (y-axis positive direction) from center 694 of omnidirectional image 684 when viewing omnidirectional image 684, and monitoring object line 692 is a line linking center 694 of omnidirectional image 684 and specified monitoring object position 690. Monitoring object line 692 coincides, for example, with a line linking center 694 of omnidirectional image 684 and the midpoint between monitoring object area coordinates (upper-left) 687 and monitoring object area coordinates (upper-right) 688.

Figure 15:
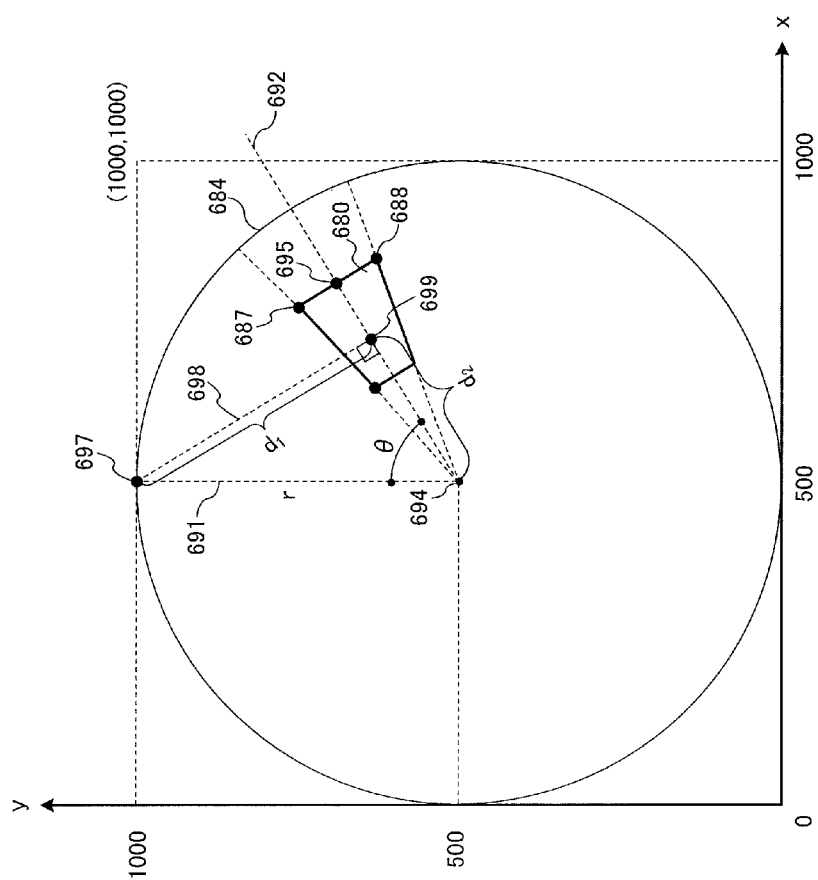
FIG. 15 is a drawing for explaining an example of a rotation amount calculation method in this embodiment.

FIG. 15 is a drawing for explaining an example of a rotation amount calculation method, and corresponds to FIG. 14. Parts in FIG. 15 identical to those in FIG. 14 are assigned the same reference codes as in FIG. 14, and descriptions thereof are omitted here. In the following description, a counterclockwise rotation direction about center 694 is considered to be positive.

In FIG. 15, when the coordinates of midpoint 695 between monitoring object area coordinates (upper-left) 687 and monitoring object area coordinates (upper-right) 688 are designated (xm, ym), monitoring object line 692 passing through midpoint 695 and center 694 is represented by equation 1 below.

(Equation 1)

$$y = \left(\frac{y_m - r}{x_m - r}\right)x + \left(r - \frac{y_m - r}{x_m - r}\right) \quad [1]$$

Here, the point of intersection of perpendicular 698 dropped from point of intersection 697 of reference line 691 and the circumference of omnidirectional image 684 to monitoring object line 692 and monitoring object line 692 is designated point of intersection 699. At this time, if the distance between point of intersection 697 and point of intersection 699 is designated d1 and the distance between center 694 and point of intersection 699 is designated d2, rotation amount θ can be calculated from equations 2 and 3 below.

(Equation 2)

$$\sin\theta = \frac{d_1}{r} \quad [2]$$

(Equation 3)

$$\cos\theta = \frac{d_2}{r} \quad [3]$$

When coordinates in a pre-rotation image are designated (x, y) and coordinates in a post-rotation image are designated (x', y'), a coefficient part corresponding to coordinates (x, y) in a pre-rotation image shown in the right-hand term of equation 4 below is calculated as a transformation matrix. Using this transformation matrix, image rotating section 406 can generate a post-rotation image in which a specified monitoring object is positioned in the center of the upper part of the image.

(Equation 4)

$$\begin{pmatrix} x' \\ y' \\ 1 \end{pmatrix} = \begin{pmatrix} 1 & 0 & r \\ 0 & 1 & r \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} \begin{pmatrix} 1 & 0 & -r \\ 0 & 1 & -r \\ 0 & 0 & 1 \end{pmatrix} \begin{pmatrix} x \\ y \\ 1 \end{pmatrix} \quad [4]$$

$$= \begin{pmatrix} \cos\theta & -\sin\theta & r - r\cos\theta + r\sin\theta \\ \sin\theta & \cos\theta & r - r\sin\theta - r\cos\theta \\ 0 & 0 & 1 \end{pmatrix} \begin{pmatrix} x \\ y \\ 1 \end{pmatrix}$$

Then, in step S3400, image rotating section 406 uses the transformation matrix calculated in step S3300 to convert pre-rotation image coordinates and generate a post-rotation image. Image rotating section 406 then outputs the generated post-rotation image and monitoring object position information indicating a specified monitoring object position and specified monitoring object area in the post-rotation image to center position moving section 407.

Figure 16:
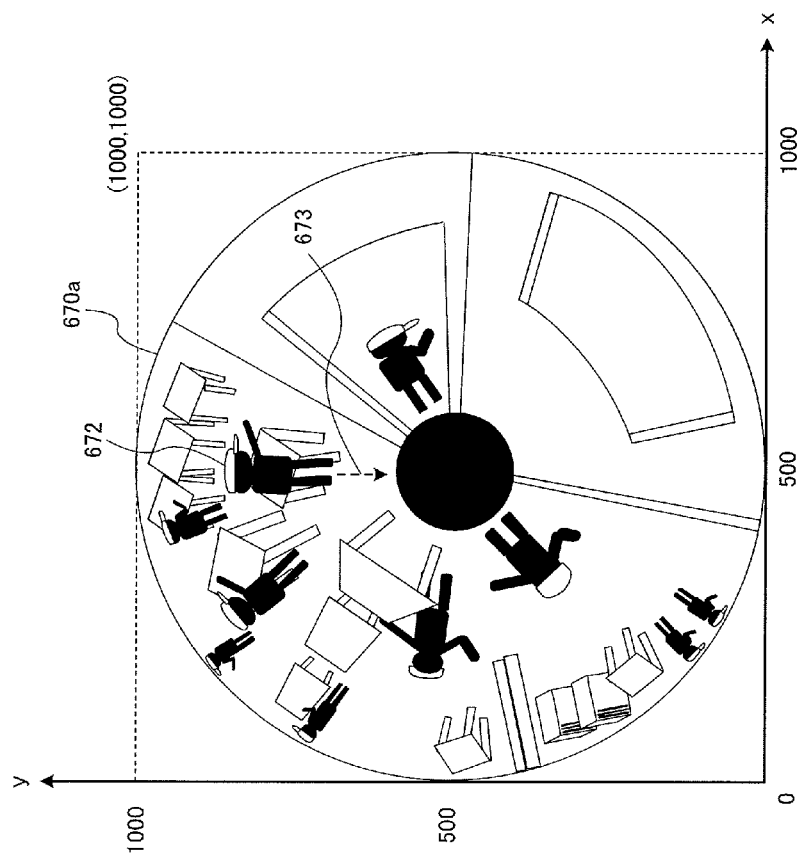
FIG. 16 is a drawing showing an example of a post-rotation image in this embodiment.

FIG. 16 is a drawing showing an example of a post-rotation image after image rotation processing has been performed on pre-rotation image 670 shown in FIG. 11.

As shown in FIG. 16, in post-rotation image 670a, specified monitoring object image 672 is positioned in the upper center, and direction 673 corresponding to the vertical direction in that real space has become a downward direction.

Next, in step S4000 in FIG. 7, center position moving section 407 performs center position movement processing on a post-rotation image (pre-movement image) input from image rotating section 406.

When performing warping processing that moves the center position of a post-rotation image downward, center position moving section 407 performs warping processing such that a specified monitoring object area is particularly enlarged.

Figure 17:
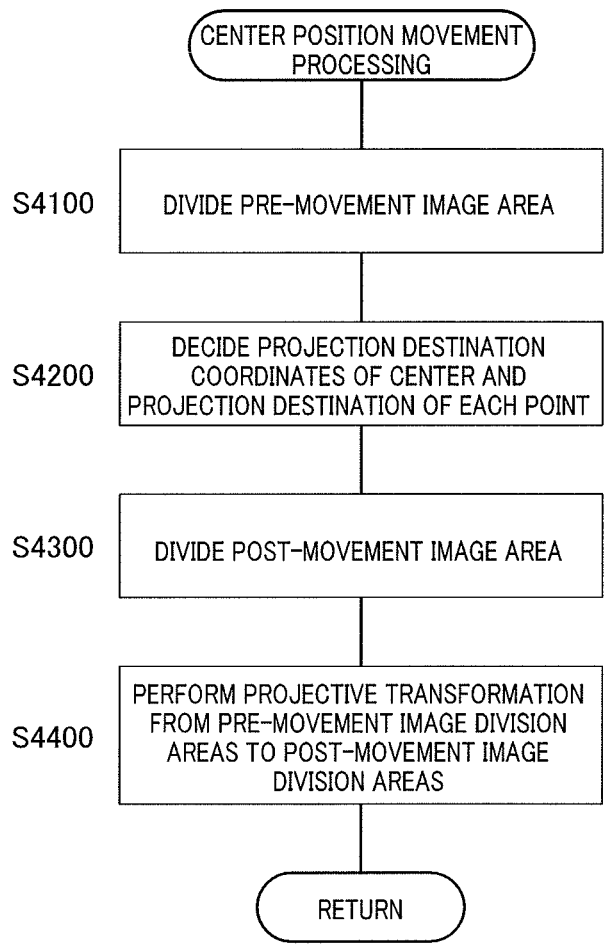
FIG. 17 is a flowchart showing an example of center position movement processing in this embodiment.

FIG. 17 is a flowchart showing an example of center position movement processing.

First, in step S4100, center position moving section 407 divides a pre-movement image area.

Figure 18:
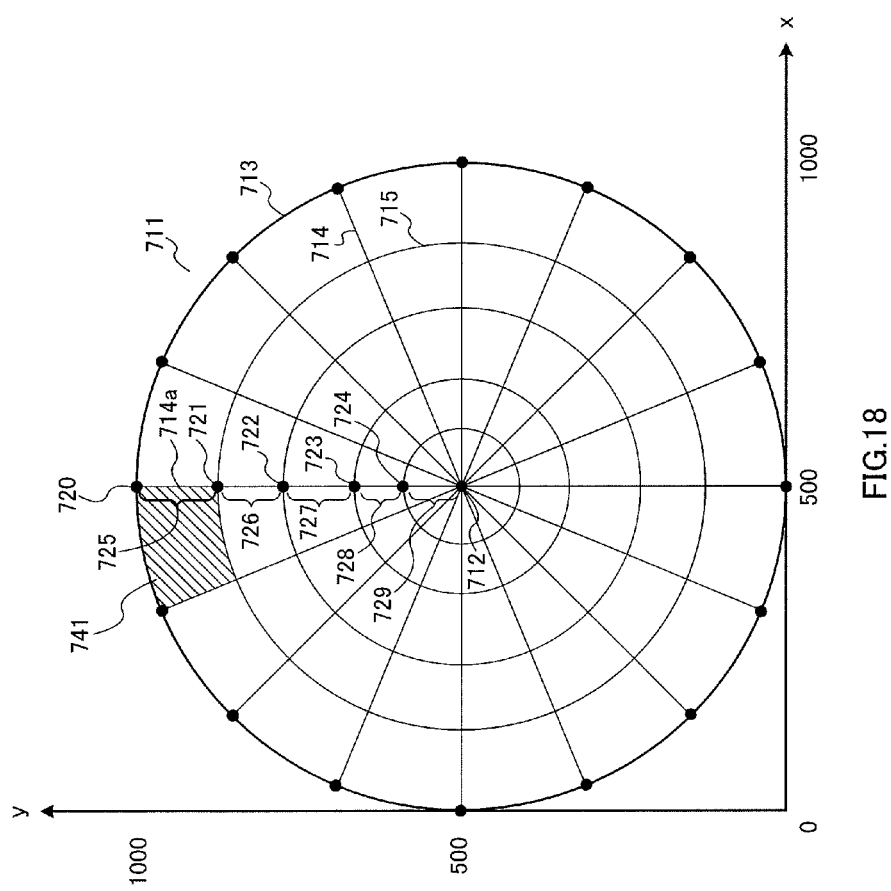
FIG. 18 is a drawing showing an example of pre-movement image area division in this embodiment.

FIG. 18 is a drawing showing an example of pre-movement image area division.

Center position moving section 407, for example, divides pre-movement image area 711 by means of a plurality of lines 714 extending radially from center 712 of pre-movement image area 711 toward circumference 713, and a plurality of circles 715 concentric with circumference 713 of the pre-movement image. When the omnidirectional image shown in FIG. 16 is input, the coordinates of center 712 are (500, 500). Plurality of lines 714 include at least line 714a extending in an upward direction (y-axis positive direction) from 712, and comprise, for example, a predetermined number of equally spaced lines. Plurality of circles 715 are positioned, for example, so that for a predetermined number of circles the radial difference from another circle 715 is fixed.

Then, in step S4200, center position moving section 407 decides a projection destination coordinates of the center of the pre-movement image. Center position moving section 407 decides center projection destination coordinates as downward coordinates (having a smaller y-coordinate). A projection destination y-coordinate may be a predetermined value, or may be a value obtained by multiplying an original y-coordinate by a predetermined ratio. For the omnidirectional image shown in FIG. 16, coordinates (500, 270) are decided, for example.

Center position moving section 407 also decides projection destination coordinates of points of intersection 720 through 724 of line 714a extending upward from center 712 to circumference 713 and circles 715. Center position moving section 407 may make point of intersection 720 of line 714a and circumference 713 a fixed value, for example. Here, in FIG. 18, the distance between point of intersection 720 and point of intersection 721 is radial direction interval 725, the distance between point of intersection 721 and point of intersection 722 is radial direction interval 726, and the distance between point of intersection 722 and point of intersection 723 is radial direction interval 727. Also, in FIG. 18, the distance between point of intersection 723 and point of intersection 724 is radial direction interval 728, and the distance between point of intersection 724 and point of intersection 728 is radial direction interval 729. At this time, center position moving section 407 decides the mutual ratios of post-projection radial direction intervals 725 through 729 (725: 726: 727: 728: 729). For example, center position moving section 407 decides the mutual ratios of post-projection radial direction intervals 725 through 729 (725: 726: 727: 728: 729) as (1.0: 1.5: 0.8: 0.5: 0.2). The mutual ratios of post-projection radial direction intervals 725 through 729 are referred to below as "post-projection interval ratios." Here, center position moving section 407 decides post-projection interval ratios so that a radial direction interval corresponding to a specified monitoring object area (here, radial direction interval 726) becomes wider so that enlarged display of the specified monitoring object is performed. Center position moving section 407 may also decide a radial direction interval corresponding to a specified monitoring object area (here, radial direction interval 726) using a ratio for the distance between center 712 and point of intersection 721 (for example, 0.3).

A center position movement distance due to projection and a post-projection interval ratio should preferably be values such that the detailed situation of a specified monitoring object and the ambient situation are sufficiently visible, and are decided based on experimentation or experience, for example.

A monitoring object positioned farther from omnidirectional camera 300 (that is, nearer omnidirectional image circumference 713) is displayed as smaller in a pre-movement image. Therefore, center position moving section 407 may decide post-projection interval ratios so that other radial direction intervals are progressively larger toward the circumference while enlarging the radial direction interval of a part corresponding to a specified monitoring object area.

Also, center position moving section 407 may increase the ratio of a part corresponding to a specified monitoring object area the longer the distance between omnidirectional camera 300 and a specified monitoring object. In this case, for example, center position moving section 407 stores beforehand a correspondence relationship between each position in an omnidirectional image and the distance to a monitoring object imaged at that position (the distance to the floor on which that monitoring object is standing). Then center position moving section 407 acquires a distance corresponding to a specified monitoring object position as a distance between omnidirectional camera 300 and the specified monitoring object. Center position moving section 407 then decides the ratio of a part corresponding to a specified monitoring object area based on the acquired distance.

Then, in step S4300, center position moving section 407 divides the post-movement image area. Specifically, center position moving section 407 decides each straight line and curved line dividing the post-movement image area as linking projection destination coordinate points at post-movement coordinates for which coordinates were decided in step S4200. By this means, the way in which straight lines and curved lines dividing the post-movement image area are projected onto the post-movement image area is decided.

Figure 19:
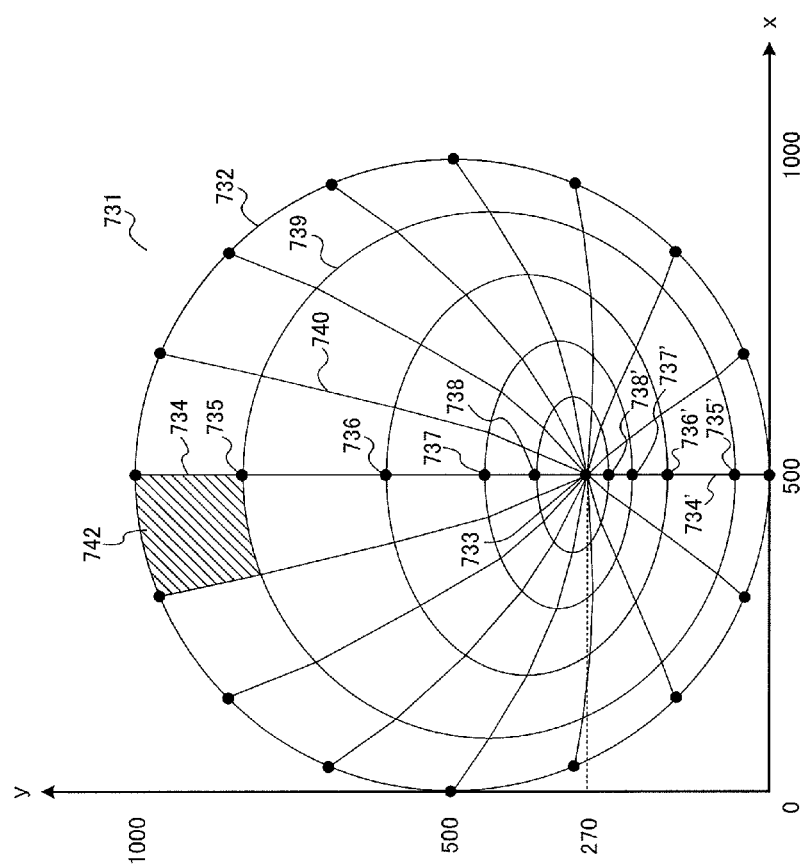
FIG. 19 is a drawing showing an example of post-movement image area division in this embodiment.

FIG. 19 is a drawing showing an example of post-movement image area division.

As shown in FIG. 19, center position moving section 407 positions decided post-projection center 733, for example. Then center position moving section 407 divides line 734 extending upward from center 733 based on the decided post-projection interval ratios, and positions division points 735 through 738. Center position moving section 407 also divides line 734' extending downward from center 733 based on the decided post-projection interval ratios, and positions division points 735' through 738'.

Following this, as shown in FIG. 19, center position moving section 407 divides post-movement image area 731 with ellipses 739 passing through positioned division points 735' through 738', corresponding respectively to pre-movement image circles (circles 715 in FIG. 18). Furthermore, center position moving section 407 divides post-movement image area 731 with lines 740 such as to divide the circumferences of ellipses 739 at equal intervals, corresponding to lines in the pre-movement image (lines 714 in FIG. 18).

Then, in step S4400, center position moving section 407 performs a projective transformation from the division areas of the pre-movement image to corresponding division areas of the post-movement image. For example, center position moving section 407 performs a projective transformation of an image of division area 741 in the pre-movement image to corresponding division area 742 in the post-movement image.

Each division area is a quadrilateral or triangle having curved lines as sides, but in order to simplify the processing, center position moving section 407 may perform projective transformation regarding all sides as straight lines. Also, the smaller the area of a pre-movement image division area and post-movement image division area, the less noticeable are the seams between division areas in the post-movement image, and the cleaner is the image.

Center position moving section 407 outputs a generated post-movement image, and monitoring object position information indicating a specified monitoring object position and specified monitoring object area in the post-movement image, to ellipsification section 408.

Next, in step S5000 in FIG. 7, ellipsification section 408 performs ellipsification processing on a post-movement image (pre-ellipsification image) input from center position moving section 407. Specifically, ellipsification section 408 executes the two-dimensional matrix transformation shown in equation 5 below, for example, on a pre-ellipsification image. Here, (x', y') indicates coordinates in a pre-ellipsification image, and (x", y") indicates coordinates in a post-ellipsification image. Sx indicates an x-axis direction enlargement factor when performing ellipsification.

(Equation 5)

$$\begin{pmatrix} x'' \\ y'' \end{pmatrix} = \begin{pmatrix} Sx & 0 \\ 0 & 0 \end{pmatrix} \begin{pmatrix} x' \\ y' \end{pmatrix} \quad [5]$$

Enlargement factor Sx may be a fixed value, or may be decided based on the size or aspect ratio of a specified object area. For example, ellipsification section 408 may calculate the aspect ratio of a specified monitoring object area, and employ an enlargement factor Sx such that that aspect ratio approaches a general aspect ratio when a person is viewed from the side. Here, the enlargement factor is assumed to be 1.5.

Figure 20:
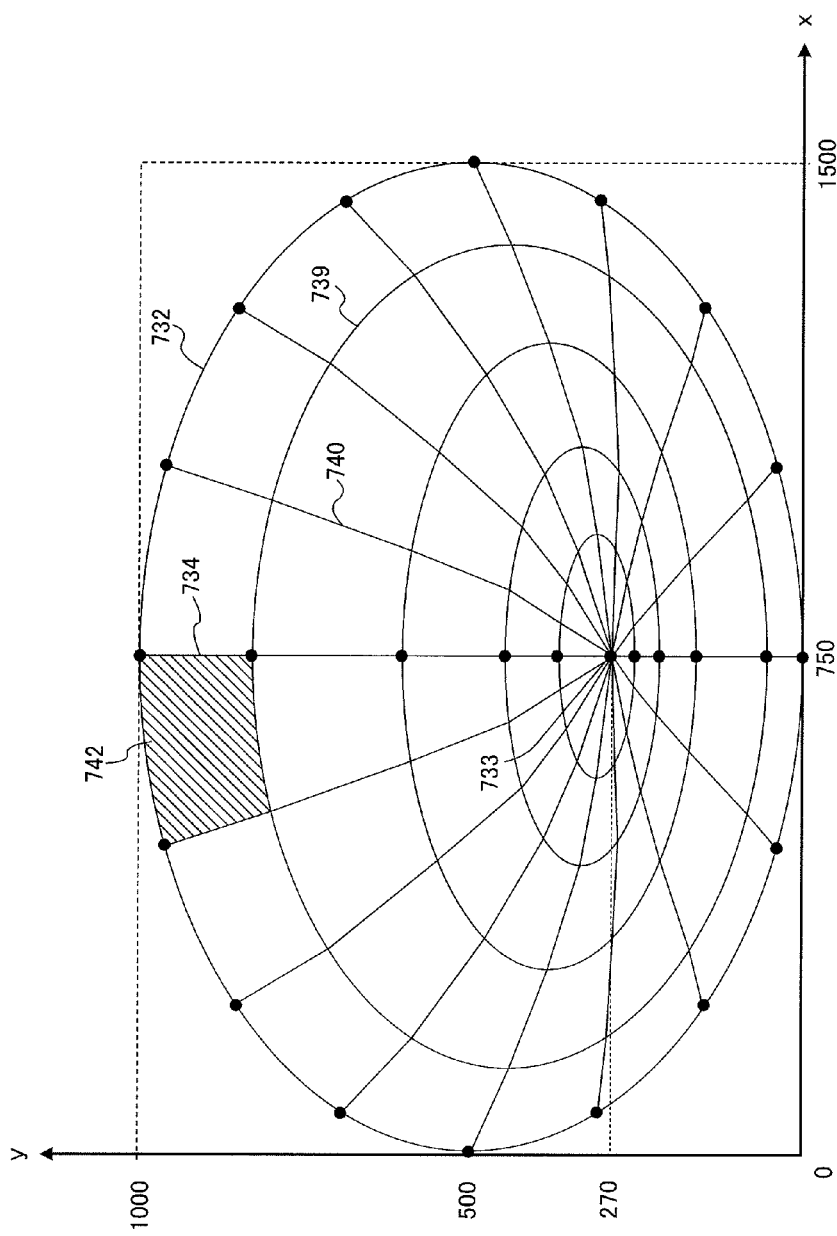
FIG. 20 is a drawing showing an example of the state of each position in a post-ellipsification image in this embodiment.

FIG. 20 is a drawing showing an example of the state in a post-ellipsification image of divided areas in a post-movement image.

As shown in FIG. 20, for pre-ellipsification image center 733 and line 734 extended upward from the center, the x-coordinate value is enlarged by the decided enlargement factor and is moved in the x-axis positive direction. Also, pre-ellipsification image circumference 732 and ellipses 739 are extended in the x-axis direction by the decided enlargement factor. Together with this, ellipsification section 408 also extends lines 740 dividing the circumferences of ellipses 739 at equal intervals, and division area 742, in the x-axis direction.

Ellipsification section 408 outputs a generated post-ellipsification image, and monitoring object position information indicating a specified monitoring object position and specified monitoring object area in the post-ellipsification image, to distortion correction section 409.

Next, in step S6000 in FIG. 7, distortion correction section 409 performs distortion correction processing on a post-ellipsification image (pre-distortion-correction image) input from ellipsification section 408.

Specifically, distortion correction section 409 performs correction of distortion such as rounding of straight lines characteristic of an omnidirectional camera 300 photographed image, which is difficult to resolve with the above-described content manipulation processing and ellipsification processing.

Figure 21:
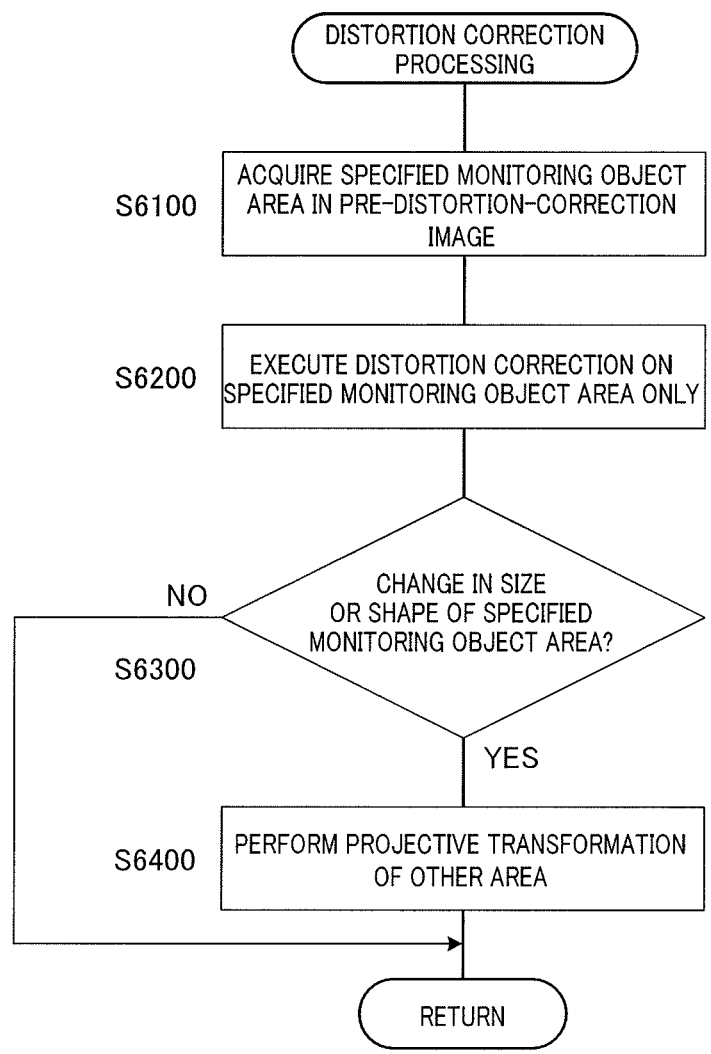
FIG. 21 is a flowchart showing an example of distortion correction processing in this embodiment.

FIG. 21 is a flowchart showing an example of distortion correction processing.

First, in step S6100, distortion correction section 409 acquires a specified monitoring object area in a post-ellipsification image. Specifically, distortion correction section 409 acquires a specified monitoring object area in a pre-distortion-correction image (post-ellipsification image) input from ellipsification section 408.

Then, in step S6200, distortion correction section 409 executes distortion correction on a calculated specified monitoring object area. The contents of distortion correction are in accordance with the optical characteristics and so forth of omnidirectional camera 300, and are determined based on experimentation or experience, for example. Distortion correction section 409 may use a distortion correction function in general image processing software. Depending on the contents of distortion correction, the size and shape of a specified monitoring object area may not be changed.

Then, in step S6300, distortion correction section 409 determines whether or not there is a change in at least either the size or shape of a specified monitoring object area. If there is a change in at least either the size or shape of the specified monitoring object area (S6300: YES), distortion correction section 409 proceeds to step S6400. If there is no change in either the size or shape of the specified monitoring object area (S6300: NO), distortion correction section 409 returns directly to the processing in FIG. 7.

In step S6400, distortion correction section 409 performs projective transformation of an area other than a specified monitoring object area of an omnidirectional image in a form that matches a change in the size and shape of the specified monitoring object area to the surrounding area.

Figure 22:
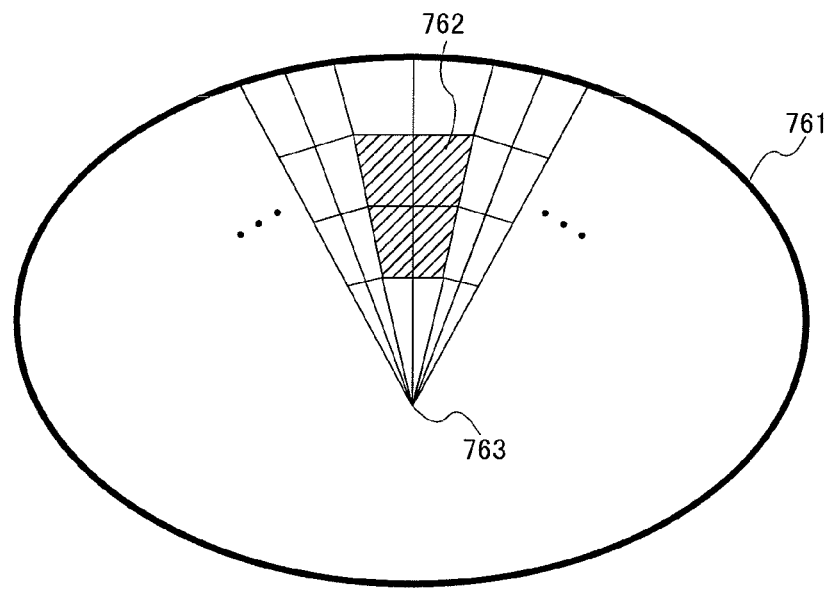
FIG. 22 is a drawing showing an example of pre-distortion-correction image area division in this embodiment.
Figure 23:
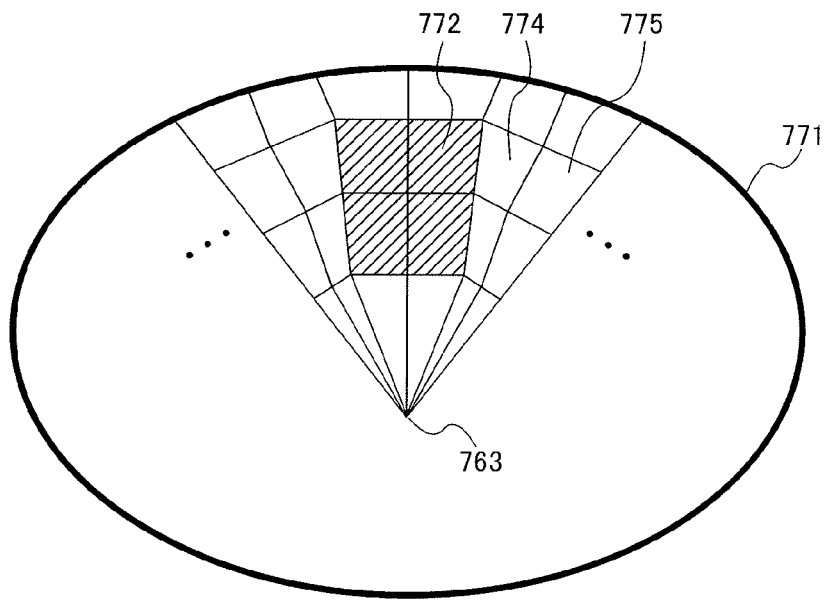
FIG. 23 is a drawing showing an example of post-distortion-correction image area division in this embodiment.

FIG. 22 is a drawing showing an example of pre-distortion-correction image area division, and FIG. 23 is a drawing showing an example of post-distortion-correction image area division.

Here, it is assumed that specified monitoring object area 762 in pre-distortion-correction image 761 corresponds to four division areas (the hatched parts in the drawing), as shown in FIG. 22. Division area delimiting is not necessarily the same as for a specified management area, but in order to simplify the description, a specified monitoring object area is here assumed to be composed of a plurality of division areas. It is also assumed that the optical characteristics of omnidirectional camera 300 are such that, in pre-distortion-correction image 76, distortion makes the horizontal direction progressively narrower toward center 763 of pre-distortion-correction image 761.

In this case, distortion correction section 409 performs correction on pre-distortion-correction image 761 so that specified monitoring object area 762 widens more toward center 763 of pre-distortion-correction image 761. Furthermore, distortion correction section 409 performs correction on pre-distortion-correction image 761 so that a specified monitoring object area for which distortion has been resolved is displayed as larger.

As a result, specified monitoring object area 772 of post-distortion-correction image 771 shown in FIG. 23 has distortion resolved to a greater extent than in the case of specified monitoring object area 762 prior to distortion correction shown in FIG. 22 through a change in the ratio of the upper side to the lower side of an isosceles trapezoid. Moreover, specified monitoring object area 772 of post-distortion-correction image 771 is larger in area than specified monitoring object area 762 prior to distortion correction.

Also, distortion correction section 409 corrects the size and shape of division areas adjacent to specified monitoring object area 772 so that the adjacency relationship between division areas is maintained. At this time, distortion correction section 409 corrects the size and shape of each division area so that a change in specified monitoring object area 772 is absorbed gradually from division area 774 adjacent to specified monitoring object area 772 to division area 775 farther away.

Then distortion correction section 409 performs projective transformation of each part other than a specified monitoring object area of the omnidirectional image to a corresponding division area after correction, and generates a post-distortion-correction image composed of a specified monitoring object area and other areas after distortion correction. Distortion correction section 409 then outputs the generated post-distortion-correction image to output image storage section 410.

By this means, a clean omnidirectional image can be obtained in which seams between a specified monitoring object area and its surroundings are not noticeable, even when distortion correction changes the size and shape of a specified monitoring object area.

Output image storage section 410 stores a post-distortion-correction image input from distortion correction section 409, and outputs the post-distortion-correction image to image output section 411.

Next, in step S7000 in FIG. 7, image output section 411 displays a post-distortion-correction image input from output image storage section 410 by means of a display such as a liquid crystal display.

Then, in step S8000, monitoring object specification section 405 determines whether or not there is a specified frame that has not been selected in step S2000.

If the frame is not the last of the specified frames—that is, if there is an unselected specified frame (S8000: NO), monitoring object specification section 405 returns to step S2000. That is to say, monitoring object specification section 405 increments the currently selected frame ID by 1 and selects the next specified frame, and repeats steps S2000 through S8000.

If the frame is the last of the specified frames—that is, if there is no unselected specified frame (S8000: YES), monitoring object specification section 405 returns to step S2000. That is to say, monitoring object specification section 405 terminates the series of processing steps.

By means of this kind of operation, omnidirectional image processing apparatus 400 can receive a specification of a monitoring object that a user wishes to focus on in omnidirectional image video, and can perform image processing on video so that that monitoring object becomes easy to see. Also, since only warping processing and linear projective transformation are performed after image rotation, the continuity of an omnidirectional image can be maintained.

Also, when there are a plurality of specified frames, omnidirectional image processing apparatus 400 can track the movement of a user-specified monitoring object within monitored area 200, and continuously display a relevant monitoring object in the upper center part of an omnidirectional image at all times.

As described above, an omnidirectional image processing apparatus according to this embodiment performs image processing on an omnidirectional image so that directions corresponding to a vertical direction and horizontal direction in real space of a specified monitoring object approach a downward direction and horizontal direction when viewing the omnidirectional image. By this means, a post-processing omnidirectional image can be displayed in a state closer to a state when a specified monitoring object is actually viewed. That is to say, a post-processing omnidirectional image can be displayed in a state in which the head of a specified monitoring object is above and the feet are below, and distortion of horizontal components is further reduced. Also, since the surroundings of a specified monitoring object are extended vertically, a specified monitoring object and ambient images can be displayed as larger, and an omnidirectional image can be presented that enables the situation of a specified monitoring object and the surroundings thereof to be more easily grasped.

Since an omnidirectional image processing apparatus according to this embodiment performs the above-described image processing by means of omnidirectional image rotation and warping processing that moves the center position of an omnidirectional image, the continuity of an omnidirectional image can be maintained.

An omnidirectional image processing apparatus according to this embodiment performs warping processing such that a specified monitoring object area is further enlarged when the center position of an omnidirectional image is moved. Furthermore, an omnidirectional image processing apparatus according to this embodiment performs ellipsification processing that extends an omnidirectional image laterally by means of linear projective transformation. By means of these processing operations, a post-processing omnidirectional image displays a specified monitoring object and a surrounding image as still larger, enabling the situation of a specified monitoring object and the surroundings thereof to be more easily grasped.

An omnidirectional image processing apparatus according to this embodiment performs warping processing such that distortion of a specified monitoring object area is corrected, and a surrounding image area is corrected in line with that correction. By this means, a post-processing omnidirectional image enables the situation of a specified monitoring object to be more easily grasped.

In this embodiment, a case has been described in which an information storage operation is completed for a collection of moving images (a plurality of specified frames) prior to an image processing operation, but application of the present invention is not limited to this. Provision may also be made, for example, for an omnidirectional image processing apparatus to perform an information storage operation and image processing operation on a frame-by-frame basis, and perform image processing and display of an omnidirectional image in real time. In this case, it is necessary for a specified frame decision to be made based on a currently displayed video specification, or based on whether or not there is a specified monitoring object, instead of being based on a frame ID specification.

An omnidirectional image processing apparatus need not necessarily execute all of the above-described image rotation processing, specified object area enlargement in center position movement processing, ellipsification processing, and distortion correction processing. For example, a specified monitoring object may be approaching the omnidirectional camera, and image quality may be good, with little distortion. In such a case, the omnidirectional image processing apparatus can improve the visibility of a monitoring object specified in that omnidirectional image while maintaining omnidirectional image continuity simply by executing only image rotation processing and center position movement processing.

In this embodiment, a specified monitoring object area has been described as an area enclosed by a frame circumscribing the outline of a person, but application of the present invention is not limited to this. A specified monitoring object area may be an area that includes not only a specified monitoring object area but also another object, such as an object located near that specified monitoring object and related to the behavior of that specified object (for example, a workbench—hereinafter referred to as "ancillary object").

Figure 24:
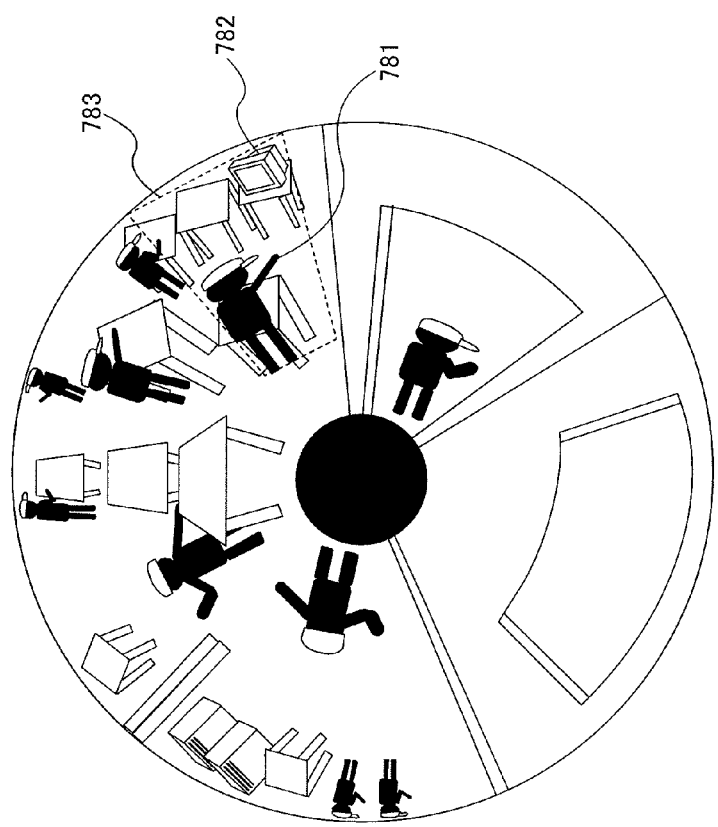
FIG. 24 is a drawing showing another example of definition of a specified monitoring object area in this embodiment.

FIG. 24 is a drawing showing another example of definition of a specified monitoring object area.

As shown in FIG. 24, it is assumed that specified monitoring object 781 works while viewing display 782. In this case, an omnidirectional image processing apparatus, for example, uses a line of sight detection section (not shown) to detect the line of sight of the worker who is specified monitoring object 781 by means of image recognition such as tracking pupil movement. The omnidirectional image processing apparatus then determines display 782 to be an ancillary monitoring object based on the detected line of sight. The line of sight detection section can be implemented by means of a camera or the like installed on a desk at which specified monitoring object 781 works, or at a low position on a wall. Then, for example, image rotating section 406 decides upon an area enclosed by the shape of an isosceles trapezoid that circumscribes an outline including both the outline of specified monitoring object 781 and display 782 that is an ancillary object. By using an area that includes a specified monitoring object and an ancillary monitoring object as a specified monitoring object area in this way, the state of an ancillary object can also be displayed in an easy-to-see fashion, and the behavior of a specified monitoring object can be grasped more easily.

A specified monitoring object area need not be an above-described isosceles trapezoid, but may also be of another shape, such as rectangular or elliptical, as long as its position in an omnidirectional image can be appropriately defined. Also, in this embodiment, provision may also be made for a monitoring object image area to be displayed in the monitoring object specification screen in FIG. 8 after undergoing distortion correction.

In this embodiment, a case has been described in which an initial-state omnidirectional image is a downward-view image, but application of the present invention is not limited to this. For example, application of the present invention is also possible when an initial-state omnidirectional image is an upward-view image. An upward-view image is, for example, an image photographed by installing omnidirectional camera 300 on the floor of monitored area 200, facing the ceiling.

As described above, in a downward-view image, in an image of a worker standing on the floor of monitored area 200, the head is oriented toward the circumference of an omnidirectional image, and the lower body is oriented toward the center of the omnidirectional image. In contrast, in an upward-view image, in an image of a worker standing on the floor of monitored area 200, the head is oriented toward the center of an omnidirectional image, and the lower body is oriented toward the circumference of the omnidirectional image.

Therefore, when an initial-state omnidirectional image is an upward-view image, an omnidirectional image processing apparatus should rotate a specified monitoring object to the lower center in image rotation processing, and move the center of the omnidirectional image upward in center position movement processing.

In this embodiment, a case has been described in which an omnidirectional camera is used that has a small reflecting mirror installed on the incident light axis, but it is also possible to apply the present invention to a case in which an omnidirectional camera that employs a fisheye lens is used.

Figure 25:
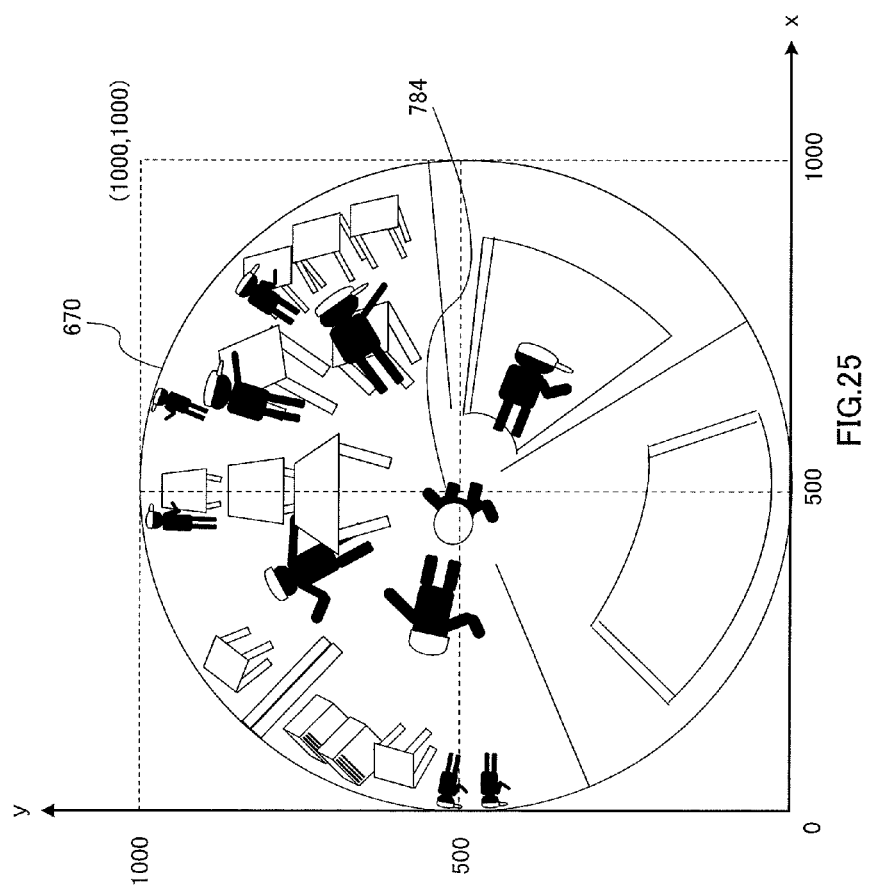
FIG. 25 is a drawing showing another example of an omnidirectional image in initial-state in this embodiment.

FIG. 25 is a drawing showing an example of a specified frame omnidirectional image in initial-state when a fisheye lens is employed, and corresponds to FIG. 12.

As shown in FIG. 25, when an omnidirectional camera that employs a fisheye lens is used, a blind area 504 does not occur in the center of pre-rotation image 670, which is an initial-state omnidirectional image. Therefore, the presence of monitoring object 784 positioned at the center point of pre-rotation image 670 is possible.

When monitoring object 784 of this kind is present, an omnidirectional image processing apparatus performs image rotation processing, for example, so that the vertical direction in real space of monitoring object 784 coincides with the downward direction when an omnidirectional image is viewed.

Figure 26:
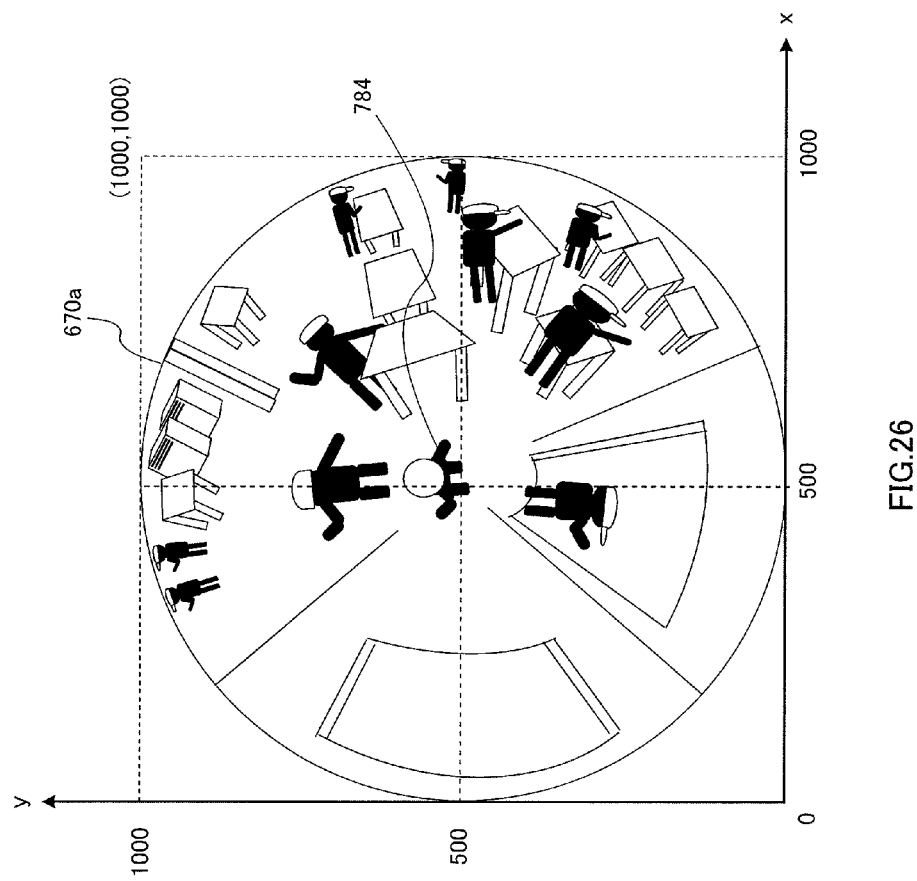
FIG. 26 is a drawing showing another example of a post-rotation image in this embodiment.

FIG. 26 is a drawing showing an example of a post-rotation image after image rotation processing has been performed on pre-rotation image 670 shown in FIG. 25 relative to monitoring object 784, and corresponds to FIG. 16. By means of this processing, post-rotation image 670a can be obtained in which a monitoring object nearest an omnidirectional camera (directly below an omnidirectional camera) is clearly visible.

It is possible for an omnidirectional image processing apparatus to improve the visibility of a monitoring object by performing the following kinds of processing, for example, after image rotation processing. The first is processing that enlarges a monitoring object image area while keeping a monitoring object at the center point of an omnidirectional image. The second is processing that moves the center of an omnidirectional image upward, and moves the center of an omnidirectional image obtained as a result downward. According to the second processing, a monitoring object is displayed in the upper part of an omnidirectional image, and it is therefore desirable to further perform distortion correction processing as necessary.

In this embodiment, a monitoring system for monitoring workers in a factory has been described, but application of the present invention is not limited to this. The present invention can be applied to various kinds of apparatuses and systems that handle omnidirectional images, such as a system that photographs the interior of a store in order to monitor shoplifting activity, for example.

The disclosure of Japanese Patent Application No. 2010-62560, filed on Mar. 18, 2010, including the specification, drawings and abstract, is incorporated herein by reference in its entirety.

INDUSTRIAL APPLICABILITY

An omnidirectional image processing apparatus and omnidirectional image processing method according to the present invention enable the visibility of a specified monitoring object in an omnidirectional image to be improved while maintaining the continuity of that omnidirectional image, and are therefore suitable for use as a monitoring system that monitors a wide area such as a store or factory.

| Reference Signs List | |
|---|---|
| 100 | Monitoring system |
| 200 | Monitored area |
| 300 | Omnidirectional camera |
| 400 | Omnidirectional image processing apparatus |
| 401 | Moving image input section |
| 402 | Moving image storage section |
| 403 | Monitoring object position information input section |
| 404 | Monitoring object position information storage section |
| 405 | Monitoring object specification section |
| 406 | Image rotating section |
| 407 | Center position moving section |
| 408 | Ellipsification section |
| 409 | Distortion correction section |
| 410 | Output image storage section |
| 411 | Image output section |

The invention claimed is:

1. An omnidirectional image processing apparatus that performs image processing on an omnidirectional image, the omnidirectional image processing apparatus comprising:

a monitoring object specification section that specifies a monitoring object photographed in the omnidirectional image;

an image rotating section that rotates the omnidirectional image so that a position of the specified monitoring object becomes upper-central, based on an angle formed by a line extending in an upper central direction from a center of the omnidirectional image and a line extending in a direction of the original position of the specified monitoring object from the center of the omnidirectional image; and a center position moving section that moves a center position of the omnidirectional image rotated by the image rotating section downward to an area above a bottom edge of the omnidirectional image by performing warping processing on the rotated omnidirectional image, the warping processing being processing that deforms an image by executing nonlinear geometric transformations on division areas into which the image is divided so that an adjacency relationship between the division areas is not destroyed.

2. The omnidirectional image processing apparatus according to claim 1, further comprising:

a monitoring object position information input section that inputs a position of the specified monitoring object in the omnidirectional image in initial-state, wherein the image rotating section rotates the omnidirectional image based on the position of the specified monitoring object.

3. The omnidirectional image processing apparatus according to claim 2, further comprising:

a moving image storage section that stores a moving image that is time series data of the omnidirectional image;

a monitoring object position information storage section that stores a position of the specified monitoring object at each time input by the monitoring object position information input section; and an image output section that outputs the moving image on which the image processing has been performed.

4. The omnidirectional image processing apparatus according to claim 1, wherein the center position moving section enlarges, in the omnidirectional image, an image area of the specified monitoring object by the warping processing.

5. The omnidirectional image processing apparatus according to claim 1, further comprising:

an image ellipsification section that changes a shape of the omnidirectional image to an elliptical shape by extending the omnidirectional image horizontally.

6. The omnidirectional image processing apparatus according to claim 1, further comprising:

a distortion correction section that locally changes, in the omnidirectional image, a shape of an image area of the specified monitoring object among monitoring objects photographed in the omnidirectional image, and corrects distortion thereof.

7. The omnidirectional image processing apparatus according to claim 1, wherein the center position moving section enlarges, in the omnidirectional image, a radial direction interval of a part corresponding to the specified monitoring object by the warping processing.

8. The omnidirectional image processing apparatus according to claim 1, wherein the center position moving section changes radial direction intervals in the omnidirectional image by the warping processing to be progressively larger toward the circumference of the omnidirectional image.

9. An omnidirectional image processing method that performs image processing on an omnidirectional image, the omnidirectional image processing method comprising:

specifying a monitoring object photographed in the omnidirectional image;

rotating the omnidirectional image so that a position of the specified monitoring object becomes upper-central, based on an angle formed by a line extending in an upper central direction from a center of the omnidirectional image and a line extending in a direction of the original position of the specified monitoring object from the center of the omnidirectional image; and moving a center position of rotated the omnidirectional image downward to an area above a bottom edge of the omnidirectional image by performing warping processing on the rotated omnidirectional image, the warping processing being processing that deforms an image by executing nonlinear geometric transformations on division areas into which the image is divided so that an adjacency relationship between the division areas is not destroyed.

* * * * *